(12) United States Patent
Ainsworth et al.

(10) Patent No.: US 12,064,941 B2
(45) Date of Patent: Aug. 20, 2024

(54) UV STABLE FIRE-RESISTANT GLAZING LAMINATES

(71) Applicant: Pyroguard UK Ltd., St. Helens (GB)

(72) Inventors: Richard Ainsworth, St. Helens (GB); Vincent Crook, St. Helens (GB); John Holland, St. Helens (GB); Saminu Magami, St. Helens (GB); Catherine Norris, St. Helens (GB)

(73) Assignee: Pyroguard UK Ltd., St. Helens (GB)

( * ) Notice: Subject to any disclaimer, the term of this patent is extended or adjusted under 35 U.S.C. 154(b) by 646 days.

(21) Appl. No.: 16/953,445

(22) Filed: Nov. 20, 2020

(65) Prior Publication Data

US 2021/0154981 A1 May 27, 2021

(30) Foreign Application Priority Data

Nov. 21, 2019 (GB) ..................... 1916952

(51) Int. Cl.
*B32B 17/10* (2006.01)
*B32B 7/023* (2019.01)
*B32B 7/10* (2006.01)

(52) U.S. Cl.
CPC ........ *B32B 17/10678* (2013.01); *B32B 7/023* (2019.01); *B32B 7/10* (2013.01); *B32B 17/10036* (2013.01); *B32B 17/10697* (2013.01); *B32B 2250/03* (2013.01); *B32B 2250/05* (2013.01); *B32B 2250/42* (2013.01); *B32B 2305/72* (2013.01); *B32B 2307/3065* (2013.01); *B32B 2307/412* (2013.01); *B32B 2307/71* (2013.01); *B32B 2551/00* (2013.01)

(58) Field of Classification Search
None
See application file for complete search history.

(56) References Cited

U.S. PATENT DOCUMENTS

| 4,626,301 A | 12/1986 | Nolte |
| 5,766,770 A | 6/1998 | Nolte et al. |
| 2012/0263903 A1* | 10/2012 | Varma ...................... C09D 7/63 |
| | | 428/428 |

FOREIGN PATENT DOCUMENTS

| EP | 2072247 A1 | 6/2009 |
| KR | 101937270 B1 | 1/2019 |
| WO | 1999019421 A1 | 4/1999 |

(Continued)

OTHER PUBLICATIONS

Goelff; WO2011120909; translation provided by Google Aug. 12, 2023.*

(Continued)

*Primary Examiner* — Guinever S Gregorio
(74) *Attorney, Agent, or Firm* — Budzyn IP Law, LLC

(57) ABSTRACT

This specification generally relates to aqueous compositions for preparing UV stable fire-resistant interlayers. It also relates to UV stable fire-resistant glazing laminates comprising such interlayers, the use of such glazing laminates in construction, and constructions comprising such glazings. An example aqueous composition comprises a mixed alkali metal silicate of general formula $SiO_2 \cdot M_2O$, where M is K or Na, and other organic and inorganic additives. Glazings with interlayers made with such aqueous compositions are simple to prepare and demonstrate good UV stability and fire-protection properties.

17 Claims, 6 Drawing Sheets

(56) References Cited

FOREIGN PATENT DOCUMENTS

| | | |
|---|---|---|
| WO | 2007010204 A1 | 1/2007 |
| WO | 2011077151 A2 | 6/2011 |
| WO | 2011120909 A1 | 6/2011 |
| WO | 2013034921 A1 | 3/2013 |

OTHER PUBLICATIONS

Search Report based on European Application No. EP20209013 dated Mar. 26, 2021.

* cited by examiner

UV STABLE FIRE-RESISTANT GLAZING LAMINATES

FIELD

The present specification relates to aqueous compositions for preparing UV stable and castable fire-resistant interlayers and processes for their preparation. It also relates to UV stable fire-resistant interlayers made from such aqueous compositions, UV stable fire-resistant glazing laminates comprising such interlayers, the preparation of UV stable fire-resistant laminates, their use in construction, and constructions comprising such laminates.

BACKGROUND

Fire-resistant glazing laminates are widely used in both domestic environments and in industrial settings. Many types of such glazing rely on glass panes for support and to provide transparency, and an intumescent sodium silicate-based interlayer between the panes for fire resistance.

Unfortunately, sodium-silicate based interlayers are susceptible to the effects of UV radiation. This manifests in the form of unsightly bubbles in the interlayer, which in some cases can turn substantial portions of the glazing opaque, reducing visibility through the laminate.

Furthermore, the preparation of sodium silicate-based fire-resistant glazing laminates typically involves application of an aqueous precursor onto a first glass pane, which is then concentrated in a special chamber to remove excess water before a further pane of glass is placed on to the dried interlayer. The removal of excess water is required not only to facilitate the subsequent solidification of the interlayer during the curing stage but also to ensure good performance, since otherwise during a fire too much steam might form in the interlayer, pushing the panes apart and reducing the fire-resistance of the glazing. However, the interlayer concentration step needed to avoid this problem requires the use of significant energy during manufacture and a large capital investment to industrialise.

Some efforts have been made to address issues of poor UV stability in sodium silicate interlayers. WO2007/010204 mentions the use of a metallic additive to absorb any hydrogen gas bubbles that may form within the interlayer. This has the disadvantage of utilising expensive metals such as platinum and palladium and is not a cost-effective method to reduce bubbling.

U.S. Pat. No. 5,766,770 suggests that introducing a small amount of potassium silicate to a sodium silicate interlayer can eliminate the problem of bubble formation in said products. However, it fails to describe the test method used to test the claim, or the criteria used to decide good UV stability.

U.S. Pat. No. 4,626,301 mentions a process for making a glazing with good UV performance by drying the interlayer in an oxygen-rich atmosphere, but again fails to describe the test method or criteria for determining success. Furthermore, the manufacturing process required is even more expensive to set up and operate than usual.

As a result, there remains a need for a UV-resistant, fire-resistant, silicate-containing intumescent fire glass which can be manufactured in a simple and cost-effective manner. To address this problem, this specification provides highly UV-stable silicate interlayers that can be made using aqueous compositions comprising certain ratios of alkali metal silicate and other additives. Interlayers with such carefully chosen ratios of alkali metal silicate have surprisingly been found to reduce bubbles produced as a by-product of manufacture or in long term use from UV radiation, while still retaining good high temperature char-flow properties that help provide good fire-resistance.

An aqueous formulation based on these components and also comprising a hydroxylated amine compound (such as ethanolamine) or quaternary ammonium hydroxide (such as tetramethyl ammonium hydroxide) and one or more polyhydric alcohols (such as xylitol or glycerol) allows levels of water to be controlled, which in turn reduces the manufacturing costs of corresponding glazing laminates since the interlayer precursor is easily castable: it can be poured between pre-assembled glass panes and gently cured to generate the basic glazing structure, rather than requiring a more energy intensive stepwise process to laminate the interlayer to a glazing pane.

The controlled water content of the aqueous compositions claimed in this specification and their castable nature even enable the preparation of UV-stable fire-resistant glazing meeting a minimum of EW30 criteria (according to EN-1364-1 and EN13501-2:2016) when using 3 mm annealed float glass in a single laminate (i.e. two panes of glass sandwiching one interlayer). Previously this was difficult because although float glass is cheap it is relatively fragile, and typical castable interlayers with a high water content are not compatible as they expand more during a fire, exerting excessive pressure on the float glass panes and causing the laminate to lose integrity.

SUMMARY

This specification describes, in part, an aqueous composition for preparing a castable UV-stable fire-resistant interlayer.

This specification also describes, in part, a process for the preparation of an aqueous composition.

This specification also describes, in part, a fire-resistant interlayer.

This specification also describes, in part, a glazing laminate.

This specification also describes, in part, a process for the manufacture of a glazing laminate.

This specification also describes, in part, the use of a glazing laminate in construction.

This specification also describes, in part, a construction comprising a glazing laminate.

ILLUSTRATIVE EMBODIMENTS

Many embodiments of the invention are detailed throughout the specification and will be apparent to a reader skilled in the art. The invention is not to be interpreted as being limited to any of the recited embodiments.

The first embodiment is an aqueous composition for preparing a castable UV-stable fire-resistant interlayer, comprising.

A mixed alkali metal silicate of general formula $SiO_2 \cdot K_2O \cdot M_2O$, where:
M is Li and/or Na,
the weight ratio of $SiO_2:K_2O$ is between about 2.5:1 and about 4.0:1, and
the weight ratio of $SiO_2:M_2O$ is between about 2.2:0.1 and about 4.5:0.1;
about 0.5% w/w-about 5% w/w of a hydroxylated amine compound and/or quaternary ammonium salt;

about 10% w/w-about 20% w/w of a polyhydric organic compound; and about 15% w/w-about 35% w/w water.

"A" or "an" mean "at least one". In any embodiment where "a" or "an" are used to denote a given material or element, "a" or "an" may mean one. In any embodiment where "a" or "an" are used to denote a given material or element, "a" or "an" may mean 1, 2, 3, 4, 5, 6, 7, 8, 9 or 10.

"Comprising" means that a given material or element may contain other materials or elements. In any embodiment where "comprising" is mentioned the given material or element may be formed of at least 10% w/w, at least 20% w/w, at least 30% w/w, or at least 40% w/w of the material or element (or combination of materials or elements). In any embodiment where "comprising" is mentioned, "comprising" may also mean "consisting of" (or "consists of") or "consisting essentially of" (or "consists essentially of") a given material or element.

"Consisting of" or "consists of" means that a given material or element is formed entirely of the material or element (or combination of materials or elements). In any embodiment where "consisting of" or "consists of" is mentioned the given material or element may be formed of 100% w/w of the material or element.

"Consisting essentially of" or "consists essentially of" means that a given material or element consists almost entirely of that material or element (or combination of materials or elements). In any embodiment where "consisting essentially of" or "consists essentially of" is mentioned the given material or element may be formed of at least 50% w/w, at least 60% w/w, at least 70% w/w, at least 80% w/w, at least 90% w/w, at least 95% w/w or at least 99% w/w of the material or element.

In any embodiment where "is" or "may be" is used to define a material or element, "is" or "may be" may mean the material or element "consists of" or "consists essentially of" the material or element.

In any embodiment where "an aqueous composition for preparing a fire-resistant interlayer comprising . . . " is mentioned, the aqueous composition for preparing a fire-resistant interlayer may consist of, or consist essentially of, its constituent materials or elements.

"Castable" means that an interlayer can be prepared by pouring an aqueous composition precursor into a pre-formed mould formed by spacing parallel spaced glass sheets (or other suitable pane materials) apart to define an internal space, and an interlayer then formed or cast in place without significant further processing (for example without a step-wise formation of the interlayer using specialist equipment).

In any embodiment where it is mentioned that an aqueous composition is "for preparing a castable UV-stable fire-resistant interlayer", it may mean that the aqueous composition is suitable for, or suitable and intended for, pouring into a pre-formed mould made by spacing parallel glass sheets (or other suitable pane materials) apart to define an internal space, and forming a UV-stable interlayer in that space by subsequent curing.

In any embodiment where it is mentioned that "an aqueous composition is for preparing a castable UV-stable fire-resistant interlayer", it may mean that the aqueous composition is suitable for, or suitable and intended for, preparing a fire-resistant glazing that meets minimum EW30 criteria when using annealed float-glass in a single laminate.

In any embodiment of this specification where "about" is mentioned, "about" may mean+/−0 (i.e. no variance), +/−0.01, +/−0.05, +/−0.1, +/−0.5, +/−1, +/−2, +/−5, +/−10, +/−20, +/−50, +/−100, +/−500 or +/−1000 units.

For example, in any embodiment of this specification where a weight ratio (e.g. a weight/weight, or w/w ratio) is mentioned, "about" may mean+/−0 (i.e. no variance), +/−0.01, +/−0.05, +/−0.1, +/−0.5, +/−1, +/−2, +/−5, +/−10, +/−20, +/−50, or +/−100 units.

For example, in any embodiment of this specification where a molar ratio is mentioned, "about" may mean+/−0 (i.e. no variance), +/−0.01, +/−0.05, +/−0.1, +/−0.5, +/−1, +/−2, +/−5, +/−10, +/−20, +/−50, or +/−100 units.

For example, in any embodiment of this specification where a percentage range is mentioned, "about" may mean+/−0 (i.e. no variance), +/−1, +/−2, +/−5, +/−10, +/−20, or +/−50 units.

For example, in any embodiment of this specification where a temperature is mentioned, "about" may mean+/−0 (i.e. no variance), +/−0.01, +/−0.05, +/−0.1, +/−0.5, +/−1, +/−2, +/−5, +/−10, +/−20, +/−50, or +/−100 units.

In any embodiment of this specification where "about" is mentioned, "about" may mean+/−0 (i.e. no variance), +/−0.01%, +/−0.05%, +/−0.1%, +/−0.5%, +/−1%, +/−2%, +/−5%, +/−10%, +/−20%, +/−50%, +/−75%, +/−90% or +/−100% of the given value.

When a weight value is described as "w/w", the value is expressed with respect to the total weight of the composition.

Claims are embodiments.

Alkali Metal Silicates

Alkali metal silicates impart heat-resistant properties to the interlayers in fire safety glazing laminates. They may generally be prepared by mixing nanoparticulate silica dispersions (e.g. Levasil®, or other suitable sources of silica, including solid silica such as fumed silica) with alkali metal hydroxide bases (for example potassium or sodium hydroxide, either as solids or premade solutions for example comprising 50% w/w of base in water). Suitable silica sources may for example have a particle size of 2-200 nm, or may be classed by surface area, for example in the range of 10-200 m²/g.

The formation of alkali metal silicates from silica and alkali metal bases is described by the following equation, where M represents a suitable cation (e.g. a group 1 metal cation such as lithium, sodium or potassium) and n is the molar amount of silica:

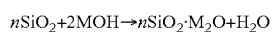

$$n\text{SiO}_2 + 2\text{MOH} \rightarrow n\text{SiO}_2 \cdot \text{M}_2\text{O} + \text{H}_2\text{O}$$

Therefore, a general formula for an alkali metal silicate is $\text{SiO}_2 \cdot \text{M}_2\text{O}$. Lithium silicate has the general formula $\text{SiO}_2 \cdot \text{Li}_2\text{O}$, sodium silicate has the general formula $\text{SiO}_2 \cdot \text{Na}_2\text{O}$ and potassium silicate has the general formula $\text{SiO}_2 \cdot \text{K}_2\text{O}$.

The use of a mixture of metal cations in the alkali metal silicate can achieve a balance of beneficial properties. For example, using a combination of potassium silicate and sodium silicate and/or lithium silicate may confer UV stability, beneficial viscosity and/or char-flow properties, and may harden the silicate interlayer and/or lengthen the lifespan of an interlayer with respect to UV light.

In any embodiment where an alkali metal silicate of general formula $\text{SiO}_2 \cdot \text{K}_2\text{O} \cdot \text{M}_2\text{O}$ where M is Li and/or Na is mentioned, M may be Li and Na (i.e. both lithium and sodium cations may be present, and the silicate may be a mixed lithium, sodium and potassium silicate).

In any embodiment where an alkali metal silicate of general formula $\text{SiO}_2 \cdot \text{K}_2\text{O} \cdot \text{M}_2\text{O}$ where M is Li and/or Na is mentioned, M may be Li (i.e. the silicate may be a mixed lithium and potassium silicate).

In any embodiment where an alkali metal silicate of general formula $SiO_2 \cdot K_2O \cdot M_2O$ where M is Li and/or Na is mentioned, M may be Na i.e. the silicate may be a mixed sodium and potassium silicate).

In any embodiment where a mixed alkali metal silicate of general formula $SiO_2 \cdot K_2O \cdot M_2O$ is mentioned,
M may be Li and/or Na,
the weight ratio of $SiO_2:K_2O$ may be between about 2.5:1 and about 4.0:1, and
the weight ratio of $SiO_2:M_2O$ may be between about 2.2:0.1 and about 4.5:0.1.

In any embodiment where a mixed alkali metal silicate of general formula $SiO_2 \cdot K_2O \cdot M_2O$ is mentioned,
M may be Li and/or Na,
the weight ratio of $SiO_2:K_2O$ may be between about 2.5:1 and about 4.0:1, and
the weight ratio of $SiO_2:M_2O$ may be between about 2.2:0.1 and about 4.1:0.1.

In any embodiment where a mixed alkali metal silicate of general formula $SiO_2 \cdot K_2O \cdot M_2O$ is mentioned,
M may be Li and/or Na,
the weight ratio of $SiO_2:K_2O$ may be about 2.5:1, and
the weight ratio of $SiO_2:M_2O$ may be about 2.2:0.1.

In any embodiment where a mixed alkali metal silicate of general formula $SiO_2 \cdot K_2O \cdot M_2O$ is mentioned,
M may be Li and/or Na,
the weight ratio of $SiO_2:K_2O$ may be about 4.0:1, and
the weight ratio of $SiO_2:M_2O$ may be about 4.5:0.1.

In any embodiment where a mixed alkali metal silicate of general formula $SiO_2 \cdot K_2O \cdot M_2O$ is mentioned,
M may be Li and/or Na,
the weight ratio of $SiO_2:K_2O$ may be about 4.0:1, and
the weight ratio of $SiO_2:M_2O$ may be about 4.1:0.1.

In any embodiment where a mixed alkali metal silicate of general formula $SiO_2 \cdot K_2O \cdot M_2O$ is mentioned,
M may be Li and/or Na,
the weight ratio of $SiO_2:K_2O$ may be about 2.5:1, and
the weight ratio of $SiO_2:M_2O$ may be about 4.5:0.1.

In any embodiment where a mixed alkali metal silicate of general formula $SiO_2 \cdot K_2O \cdot M_2O$ is mentioned,
M may be Li and/or Na,
the weight ratio of $SiO_2:K_2O$ may be about 2.5:1, and
the weight ratio of $SiO_2:M_2O$ may be about 4.1:0.1.

In any embodiment where a mixed alkali metal silicate of general formula $SiO_2 \cdot K_2O \cdot M_2O$ is mentioned,
M may be Li and/or Na,
the weight ratio of $SiO_2:K_2O$ may be about 4.0:1, and
the weight ratio of $SiO_2:M_2O$ may be about 2.2:0.1.

In any embodiment where a mixed alkali metal silicate of general formula $SiO_2 \cdot K_2O \cdot M_2O$ is mentioned,
M may be Li and/or Na,
the weight ratio of $SiO_2:K_2O:M_2O$ may be between about 2.5:1:0.1 and about 3:1:0.1.

In any embodiment where a mixed alkali metal silicate of general formula $SiO_2 \cdot K_2O \cdot M_2O$ is mentioned,
M may be Li and/or Na,
the weight ratio of $SiO_2:K_2O:M_2O$ may be about 3:1:0.1.

In any embodiment where a mixed alkali metal silicate of general formula $SiO_2 \cdot K_2O \cdot M_2O$ is mentioned,
M may be Li and/or Na, and
the weight ratio of $SiO_2:K_2O:M_2O$ may be about 2.9:1:0.1.

In any embodiment where a mixed alkali metal silicate of general formula $SiO_2 \cdot K_2O \cdot M_2O$ is mentioned,
M may be Li and/or Na,
the weight ratio of $SiO_2:K_2O:M_2O$ may be between 2.5+/−1:1+/−0.5:0.1+/−0.05 and 3+/−1:1+/−0.5:0.1+/−0.05.

In any embodiment where a mixed alkali metal silicate of general formula $SiO_2 \cdot K_2O \cdot M_2O$ is mentioned,
M may be Li and/or Na,
the weight ratio of $SiO_2:K_2O:M_2O$ may be 3+/−1:1+/−0.5:0.1+/−0.5.

In any embodiment where a mixed alkali metal silicate of general formula $SiO_2 \cdot K_2O \cdot M_2O$ is mentioned,
M may be Li and/or Na, and
the weight ratio of $SiO_2:K_2O:M_2O$ may be 2.9+/−1:1+/−0.5:1:0.1+/−0.05.

In any embodiment where a mixed alkali metal silicate of general formula $SiO_2 \cdot K_2O \cdot M_2O$ is mentioned,
M may be Li and/or Na,
the weight ratio of $SiO_2:K_2O$ may be between 2.5:1 and 4.0:1, and
the weight ratio of $SiO_2:M_2O$ may be between 2.2:0.1 and 4.5:0.1.

In any embodiment where a mixed alkali metal silicate of general formula $SiO_2 \cdot K_2O \cdot M_2O$ is mentioned,
M may be Li and/or Na,
the weight ratio of $SiO_2:K_2O$ may be between 2.5:1 and 4.0:1, and
the weight ratio of $SiO_2:M_2O$ may be between 2.2:0.1 and 4.14:0.1.

In any embodiment where a mixed alkali metal silicate of general formula $SiO_2 \cdot K_2O \cdot M_2O$ is mentioned,
M may be Li and/or Na,
the weight ratio of $SiO_2:K_2O$ may be 2.5:1, and
the weight ratio of $SiO_2:M_2O$ may be 2.27:0.1.

In any embodiment where a mixed alkali metal silicate of general formula $SiO_2 \cdot K_2O \cdot M_2O$ is mentioned,
M may be Li and/or Na,
the weight ratio of $SiO_2:K_2O$ may be 4.0:1, and
the weight ratio of $SiO_2:M_2O$ may be 4.5:0.1.

In any embodiment where a mixed alkali metal silicate of general formula $SiO_2 \cdot K_2O \cdot M_2O$ is mentioned,
M may be Li and/or Na,
the weight ratio of $SiO_2:K_2O$ may be 4.0:1, and
the weight ratio of $SiO_2:M_2O$ may be 4.14:0.1.

In any embodiment where a mixed alkali metal silicate of general formula $SiO_2 \cdot K_2O \cdot M_2O$ is mentioned,
M may be Li and/or Na,
the weight ratio of $SiO_2:K_2O$ may be 2.5:1, and
the weight ratio of $SiO_2:M_2O$ may be 4.5:0.1.

In any embodiment where a mixed alkali metal silicate of general formula $SiO_2 \cdot K_2O \cdot M_2O$ is mentioned,
M may be Li and/or Na,
the weight ratio of $SiO_2:K_2O$ may be 4.0:1, and
the weight ratio of $SiO_2:M_2O$ may be 4.14:0.1.

In any embodiment where a mixed alkali metal silicate of general formula $SiO_2 \cdot K_2O \cdot M_2O$ is mentioned,
M may be Li and/or Na,
the weight ratio of $SiO_2:K_2O$ may be 4.0:1, and
the weight ratio of $SiO_2:M_2O$ may be 2.27:0.1.

In any embodiment where a mixed alkali metal silicate of general formula $SiO_2 \cdot K_2O \cdot M_2O$ is mentioned,
M may be Li and/or Na, and
the weight ratio of $SiO_2:K_2O:M_2O$ may be between 2.5:1:0.1 and 3:1:0.1.

In any embodiment where a mixed alkali metal silicate of general formula $SiO_2 \cdot K_2O \cdot M_2O$ is mentioned,
M may be Li and/or Na, and
the weight ratio of $SiO_2:K_2O:M_2O$ may be 3:1:0.1.

In any embodiment where a mixed alkali metal silicate of general formula $SiO_2 \cdot K_2O \cdot M_2O$ is mentioned,
M may be Li and/or Na, and
the weight ratio of $SiO_2:K_2O:M_2O$ may be 2.9:1:0.1.

In any embodiment where an alkali metal silicate of general formula $SiO_2 \cdot K_2O \cdot M_2O$ where M is Li and/or Na is mentioned,
M may be Li,
the weight ratio of $SiO_2:K_2O$ may be between about 2.5:1 and about 4.0:1, and
the weight ratio of $SiO_2:Li_2O$ may be between about 2.2:0.1 and about 4.5:0.1.

In any embodiment where an alkali metal silicate of general formula $SiO_2 \cdot K_2O \cdot M_2O$ where M is Li and/or Na is mentioned,
M may be Li,
the weight ratio of $SiO_2:K_2O$ may be between about 2.5:1 and about 4.0:1, and
the weight ratio of $SiO_2:Li_2O$ may be between about 2.2:0.1 and about 4.1:0.1.

In any embodiment where an alkali metal silicate of general formula $SiO_2 \cdot K_2O \cdot M_2O$ where M is Li and/or Na is mentioned,
M may be Li,
the weight ratio of $SiO_2:K_2O$ may be about 2.5:1, and
the weight ratio of $SiO_2:Li_2O$ may be about 2.2:0.1.

In any embodiment where an alkali metal silicate of general formula $SiO_2 \cdot K_2O \cdot M_2O$ where M is Li and/or Na is mentioned,
M may be Li,
the weight ratio of $SiO_2:K_2O$ may be about 4.0:1, and
the weight ratio of $SiO_2:Li_2O$ may be about 4.5:0.1.

In any embodiment where an alkali metal silicate of general formula $SiO_2 \cdot K_2O \cdot M_2O$ where M is Li and/or Na is mentioned,
M may be Li,
the weight ratio of $SiO_2:K_2O$ may be about 4.0:1, and
the weight ratio of $SiO_2:Li_2O$ may be about 4.1:0.1.

In any embodiment where an alkali metal silicate of general formula $SiO_2 \cdot K_2O \cdot M_2O$ where M is Li and/or Na is mentioned,
M may be Li,
the weight ratio of $SiO_2:K_2O$ may be about 2.5:1, and
the weight ratio of $SiO_2:Li_2O$ may be about 4.5:0.1.

In any embodiment where an alkali metal silicate of general formula $SiO_2 \cdot K_2O \cdot M_2O$ where M is Li and/or Na is mentioned,
M may be Li,
the weight ratio of $SiO_2:K_2O$ may be about 2.5:1, and
the weight ratio of $SiO_2:Li_2O$ may be about 4.1:0.1.

In any embodiment where an alkali metal silicate of general formula $SiO_2 \cdot K_2O \cdot M_2O$ where M is Li and/or Na is mentioned,
M may be Li,
the weight ratio of $SiO_2:K_2O$ may be about 4.0:1, and
the weight ratio of $SiO_2:Li_2O$ may be about 2.2:0.1.

In any embodiment where an alkali metal silicate of general formula $SiO_2 \cdot K_2O \cdot M_2O$ where M is Li and/or Na is mentioned,
M may be Li, and
the weight ratio of $SiO_2:K_2O:Li_2O$ may be between about 2.5:1:0.1 and about 3:1:0.1.

In any embodiment where an alkali metal silicate of general formula $SiO_2 \cdot K_2O \cdot M_2O$ where M is Li and/or Na is mentioned,
M may be Li, and
the weight ratio of $SiO_2:K_2O:Li_2O$ may be about 3:1:0.1.

In any embodiment where an alkali metal silicate of general formula $SiO_2 \cdot K_2O \cdot M_2O$ where M is Li and/or Na is mentioned,
M may be Li, and
the weight ratio of $SiO_2:K_2O:Li_2O$ may be about 2.9:1:0.1.

In any embodiment where an alkali metal silicate of general formula $SiO_2 \cdot K_2O \cdot M_2O$ where M is Li and/or Na is mentioned,
M may be Li, and
the weight ratio of $SiO_2:K_2O:Li_2O$ may be between $2.5+/-1:1+/-0.5:0.1+/-0.05$ and $3+/-1:1+/-0.5:0.1+/-0.05$.

In any embodiment where an alkali metal silicate of general formula $SiO_2 \cdot K_2O \cdot M_2O$ where M is Li and/or Na is mentioned,
M may be Li, and
the weight ratio of $SiO_2:K_2O:Li_2O$ may be $3+/-1:1+/-0.5:0.1+/-0.5$.

In any embodiment where an alkali metal silicate of general formula $SiO_2 \cdot K_2O \cdot M_2O$ where M is Li and/or Na is mentioned,
M may be Li, and
the weight ratio of $SiO_2:K_2O:Li_2O$ may be $2.9+/-1:1+/-0.5:0.1+/-0.5$.

In any embodiment where an alkali metal silicate of general formula $SiO_2 \cdot K_2O \cdot M_2O$ where M is Li and/or Na is mentioned,
M may be Li,
the weight ratio of $SiO_2:K_2O$ may be between 2.5:1 and 4.0:1, and
the weight ratio of $SiO_2:Li_2O$ may be between 2.2:0.1 and 4.5:0.1.

In any embodiment where an alkali metal silicate of general formula $SiO_2 \cdot K_2O \cdot M_2O$ where M is Li and/or Na is mentioned,
M may be Li,
the weight ratio of $SiO_2:K_2O$ may be between 2.5:1 and 4.0:1, and
the weight ratio of $SiO_2:Li_2O$ may be between 2.2:0.1 and 4.14:0.1.

In any embodiment where an alkali metal silicate of general formula $SiO_2 \cdot K_2O \cdot M_2O$ where M is Li and/or Na is mentioned,
M may be Li,
the weight ratio of $SiO_2:K_2O$ may be 2.5:1, and
the weight ratio of $SiO_2:Li_2O$ may be 2.27:0.1.

In any embodiment where an alkali metal silicate of general formula $SiO_2 \cdot K_2O \cdot M_2O$ where M is Li and/or Na is mentioned,
M may be Li,
the weight ratio of $SiO_2:K_2O$ may be 4.0:1, and
the weight ratio of $SiO_2:Li_2O$ may be 4.5:0.1.

In any embodiment where an alkali metal silicate of general formula $SiO_2 \cdot K_2O \cdot M_2O$ where M is Li and/or Na is mentioned,
M may be Li,
the weight ratio of $SiO_2:K_2O$ may be 4.0:1, and
the weight ratio of $SiO_2:Li_2O$ may be 4.14:0.1.

In any embodiment where an alkali metal silicate of general formula $SiO_2 \cdot K_2O \cdot M_2O$ where M is Li and/or Na is mentioned, M may be Li,
the weight ratio of $SiO_2:K_2O$ may be 2.5:1, and
the weight ratio of $SiO_2:Li_2O$ may be 4.5:0.1.

In any embodiment where an alkali metal silicate of general formula $SiO_2 \cdot K_2O \cdot M_2O$ where M is Li and/or Na is mentioned,
M may be Li,
the weight ratio of $SiO_2:K_2O$ may be 2.5:1, and
the weight ratio of $SiO_2:Li_2O$ may be 4.14:0.1.

In any embodiment where an alkali metal silicate of general formula $SiO_2 \cdot K_2O \cdot M_2O$ where M is Li and/or Na is mentioned,
M may be Li,
the weight ratio of $SiO_2:K_2O$ may be 4.0:1, and
the weight ratio of $SiO_2:Li_2O$ may be 2.27:0.1.

In any embodiment where an alkali metal silicate of general formula $SiO_2 \cdot K_2O \cdot M_2O$ where M is Li and/or Na is mentioned,
M may be Li, and
the weight ratio of $SiO_2:K_2O:Li_2O$ may be between 2.5:1:0.1 and 3:1:0.1.

In any embodiment where an alkali metal silicate of general formula $SiO_2 \cdot K_2O \cdot M_2O$ where M is Li and/or Na is mentioned,
M may be Li, and
the weight ratio of $SiO_2:K_2O:Li_2O$ may be 3:1:0.1.

In any embodiment where an alkali metal silicate of general formula $SiO_2 \cdot K_2O \cdot M_2O$ where M is Li and/or Na is mentioned,
M may be Li, and
the weight ratio of $SiO_2:K_2O:Li_2O$ may be 2.9:1:0.1.

In any embodiment where an alkali metal silicate of general formula $SiO_2 \cdot K_2O \cdot M_2O$ where M is Li and/or Na is mentioned,
M may be Na,
the weight ratio of $SiO_2:K_2O$ may be between about 2.5:1 and about 4.0:1, and
the weight ratio of $SiO_2:Na_2O$ may be between about 2.2:0.1 and about 4.5:0.1.

In any embodiment where an alkali metal silicate of general formula $SiO_2 \cdot K_2O \cdot M_2O$ where M is Li and/or Na is mentioned,
M may be Na,
the weight ratio of $SiO_2:K_2O$ may be between about 2.5:1 and about 4.0:1, and
the weight ratio of $SiO_2:Na_2O$ may be between about 2.2:0.1 and about 4.1:0.1.

In any embodiment where an alkali metal silicate of general formula $SiO_2 \cdot K_2O \cdot M_2O$ where M is Li and/or Na is mentioned,
M may be Na,
the weight ratio of $SiO_2:K_2O$ may be about 2.5:1, and
the weight ratio of $SiO_2:Na_2O$ may be about 2.2:0.1.

In any embodiment where an alkali metal silicate of general formula $SiO_2 \cdot K_2O \cdot M_2O$ where M is Li and/or Na is mentioned,
M may be Na,
the weight ratio of $SiO_2:K_2O$ may be about 4.0:1, and
the weight ratio of $SiO_2:Na_2O$ may be about 4.5:0.1.

In any embodiment where an alkali metal silicate of general formula $SiO_2 \cdot K_2O \cdot M_2O$ where M is Li and/or Na is mentioned,
M may be Na,
the weight ratio of $SiO_2:K_2O$ may be about 4.0:1, and
the weight ratio of $SiO_2:Na_2O$ may be about 4.1:0.1.

In any embodiment where an alkali metal silicate of general formula $SiO_2 \cdot K_2O \cdot M_2O$ where M is Li and/or Na is mentioned,
M may be Na,
the weight ratio of $SiO_2:K_2O$ may be about 2.5:1, and
the weight ratio of $SiO_2:Na_2O$ may be about 4.5:0.1.

In any embodiment where an alkali metal silicate of general formula $SiO_2 \cdot K_2O \cdot M_2O$ where M is Li and/or Na is mentioned,
M may be Na,
the weight ratio of $SiO_2:K_2O$ may be about 2.5:1, and
the weight ratio of $SiO_2:Na_2O$ may be about 4.1:0.1.

In any embodiment where an alkali metal silicate of general formula $SiO_2 \cdot K_2O \cdot M_2O$ where M is Li and/or Na is mentioned,
M may be Na,
the weight ratio of $SiO_2:K_2O$ may be about 4.0:1, and
the weight ratio of $SiO_2:Na_2O$ may be about 2.2:0.1.

In any embodiment where an alkali metal silicate of general formula $SiO_2 \cdot K_2O \cdot M_2O$ where M is Li and/or Na is mentioned,
M may be Na, and
the weight ratio of $SiO_2:K_2O:Na_2O$ may be between about 2.5:1:0.1 and about 3:1:0.1.

In any embodiment where an alkali metal silicate of general formula $SiO_2 \cdot K_2O \cdot M_2O$ where M is Li and/or Na is mentioned,
M may be Na, and
the weight ratio of $SiO_2:K_2O:Na_2O$ may be about 3:1:0.1.

In any embodiment where an alkali metal silicate of general formula $SiO_2 \cdot K_2O \cdot M_2O$ where M is Li and/or Na is mentioned,
M may be Na, and
the weight ratio of $SiO_2:K_2O:Na_2O$ may be about 2.9:1:0.1.

In any embodiment where an alkali metal silicate of general formula $SiO_2 \cdot K_2O \cdot M_2O$ where M is Li and/or Na is mentioned,
M may be Na, and
the weight ratio of $SiO_2:K_2O:Na_2O$ may be between 2.5+/−1:1+/−0.5:0.1+/−0.05 and 3+/−1:1+/−0.5:0.1+/−0.05.

In any embodiment where an alkali metal silicate of general formula $SiO_2 \cdot K_2O \cdot M_2O$ where M is Li and/or Na is mentioned,
M may be Na, and
the weight ratio of $SiO_2:K_2O:Na_2O$ may be 3+/−1:1+/−0.5:0.1+/−0.05.

In any embodiment where an alkali metal silicate of general formula $SiO_2 \cdot K_2O \cdot M_2O$ where M is Li and/or Na is mentioned,
M may be Na, and
the weight ratio of $SiO_2:K_2O:Na_2O$ may be 2.9+/−1:1+/−0.5:1:0.1+/−0.05.

In any embodiment where an alkali metal silicate of general formula $SiO_2 \cdot K_2O \cdot M_2O$ where M is Li and/or Na is mentioned,
M may be Na,
the weight ratio of $SiO_2:K_2O$ may be between 2.5:1 and 4.0:1, and
the weight ratio of $SiO_2:Na_2O$ may be between 2.2:0.1 and 4.5:0.1.

In any embodiment where an alkali metal silicate of general formula $SiO_2 \cdot K_2O \cdot M_2O$ where M is Li and/or Na is mentioned, M may be Na,
the weight ratio of $SiO_2:K_2O$ may be between 2.5:1 and 4.0:1, and
the weight ratio of $SiO_2:Na_2O$ may be between 2.2:0.1 and 4.14:0.1.

In any embodiment where an alkali metal silicate of general formula $SiO_2 \cdot K_2O \cdot M_2O$ where M is Li and/or Na is mentioned,
M may be Na,
the weight ratio of $SiO_2:K_2O$ may be 2.5:1, and
the weight ratio of $SiO_2:Na_2O$ may be 2.27:0.1.

In any embodiment where an alkali metal silicate of general formula $SiO_2 \cdot K_2O \cdot M_2O$ where M is Li and/or Na is mentioned,
M may be Na,
the weight ratio of $SiO_2:K_2O$ may be 4.0:1, and
the weight ratio of $SiO_2:Na_2O$ may be 4.5:0.1.

In any embodiment where an alkali metal silicate of general formula $SiO_2 \cdot K_2O \cdot M_2O$ where M is Li and/or Na is mentioned,
M may be Na,
the weight ratio of $SiO_2:K_2O$ may be 4.0:1, and
the weight ratio of $SiO_2:Na_2O$ may be 4.14:0.1.

In any embodiment where an alkali metal silicate of general formula $SiO_2 \cdot K_2O \cdot M_2O$ where M is Li and/or Na is mentioned,
M may be Na,
the weight ratio of $SiO_2:K_2O$ may be 2.5:1, and
the weight ratio of $SiO_2:Na_2O$ may be 4.5:0.1.

In any embodiment where an alkali metal silicate of general formula $SiO_2 \cdot K_2O \cdot M_2O$ where M is Li and/or Na is mentioned,
M may be Na,
the weight ratio of $SiO_2:K_2O$ may be 2.5:1, and
the weight ratio of $SiO_2:Na_2O$ may be 4.14:0.1.

In any embodiment where an alkali metal silicate of general formula $SiO_2 \cdot K_2O \cdot M_2O$ where M is Li and/or Na is mentioned,
M may be Na,
the weight ratio of $SiO_2:K_2O$ may be 4.0:1, and
the weight ratio of $SiO_2:Na_2O$ may be 2.27:0.1.

In any embodiment where an alkali metal silicate of general formula $SiO_2 \cdot K_2O \cdot M_2O$ where M is Li and/or Na is mentioned,
M may be Na, and
the weight ratio of $SiO_2:K_2O:Na_2O$ may be between 2.5:1:0.1 and 3:1:0.1.

In any embodiment where an alkali metal silicate of general formula $SiO_2 \cdot K_2O \cdot M_2O$ where M is Li and/or Na is mentioned,
M may be Na, and
the weight ratio of $SiO_2:K_2O:Na_2O$ may be 3:1:0.1.

In any embodiment where an alkali metal silicate of general formula $SiO_2 \cdot K_2O \cdot M_2O$ where M is Li and/or Na is mentioned,
M may be Na, and
the weight ratio of $SiO_2:K_2O:Na_2O$ may be 2.9:1:0.1.

In any embodiment where an alkali metal silicate of general formula $SiO_2 \cdot K_2O \cdot M_2O$ where M is Li and/or Na is mentioned, M may be Li and/or Na and the silicate may comprise:
about 25% w/w-about 45% w/w $SiO_2$,
about 5% w/w-about 20% w/w $K_2O$,
about 0.1% w/w-about 1% w/w $Li_2O$, and
about 0.5% w/w-about 3% w/w $Na_2O$.

In any embodiment where an alkali metal silicate of general formula $SiO_2 \cdot K_2O \cdot M_2O$ where M is Li and/or Na is mentioned, M may be Na and the silicate may comprise:
about 30% w/w-about 40% w/w $SiO_2$,
about 10% w/w-about 15% w/w $K_2O$,
about 0.2% w/w-about 0.5% w/w $Li_2O$, and
about 0.5% w/w-about 1.5% w/w $Na_2O$.

In any embodiment where an alkali metal silicate of general formula $SiO_2 \cdot K_2O \cdot M_2O$ where M is Li and/or Na is mentioned, M may be Na and the silicate may comprise:
about 31.5% w/w-about 39.4% w/w $SiO_2$,
about 12.3% w/w-about 13.7% w/w $K_2O$,
about 0.3% w/w $Li_2O$, and
about 0.9% w/w-about 1.4% w/w $Na_2O$.

In any embodiment where an alkali metal silicate of general formula $SiO_2 \cdot K_2O \cdot M_2O$ where M is Li and/or Na is mentioned, M may be Li and/or Na and the silicate may comprise:
25% w/w-45% w/w $SiO_2$,
5% w/w-20% w/w $K_2O$,
0.1% w/w-1% w/w $Li_2O$, and
0.5% w/w-3% w/w $Na_2O$.

In any embodiment where an alkali metal silicate of general formula $SiO_2 \cdot K_2O \cdot M_2O$ where M is Li and/or Na is mentioned, M may be Na and the silicate may comprise:
30% w/w-40% w/w $SiO_2$,
10% w/w-15% w/w $K_2O$,
0.2% w/w-0.5% w/w $Li_2O$, and
0.5% w/w-1.5% w/w $Na_2O$.

In any embodiment where an alkali metal silicate of general formula $SiO_2 \cdot K_2O \cdot M_2O$ where M is Li and/or Na is mentioned, M may be Na and the silicate may comprise:
31.5% w/w-39.4% w/w $SiO_2$,
12.3% w/w-13.7% w/w $K_2O$,
0.3% w/w $Li_2O$, and
0.9% w/w-1.4% w/w $Na_2O$.

In any embodiment where an alkali metal silicate of general formula $SiO_2 \cdot K_2O \cdot M_2O$ where M is Li and/or Na is mentioned, M may be Li and the silicate may comprise:
about 25% w/w-about 45% w/w $SiO_2$,
about 5% w/w-about 20% w/w $K_2O$, and
about 0.1% w/w-about 1% w/w $Li_2O$.

In any embodiment where an alkali metal silicate of general formula $SiO_2 \cdot K_2O \cdot M_2O$ where M is Li and/or Na is mentioned, M may be Li and the silicate may comprise:
about 30% w/w-about 40% w/w $SiO_2$,
about 10% w/w-about 15% w/w $K_2O$, and
about 0.2% w/w-about 0.5% w/w $Li_2O$.

In any embodiment where an alkali metal silicate of general formula $SiO_2 \cdot K_2O \cdot M_2O$ where M is Li and/or Na is mentioned, M may be Li and the silicate may comprise:
about 31.5% w/w-about 39.4% w/w $SiO_2$,
about 12.3% w/w-about 13.7% w/w $K_2O$, and
about 0.3% w/w $Li_2O$.

In any embodiment where an alkali metal silicate of general formula $SiO_2 \cdot K_2O \cdot M_2O$ where M is Li and/or Na is mentioned, M may be Li and the silicate may comprise:
25% w/w-45% w/w $SiO_2$,
5% w/w-20% w/w $K_2O$, and
0.1% w/w-1% w/w $Li_2O$.

In any embodiment where an alkali metal silicate of general formula $SiO_2 \cdot K_2O \cdot M_2O$ where M is Li and/or Na is mentioned, M may be Li and the silicate may comprise:
30% w/w-40% w/w $SiO_2$,
10% w/w-15% w/w $K_2O$, and
0.2% w/w-0.5% w/w $Li_2O$.

In any embodiment where an alkali metal silicate of general formula $SiO_2 \cdot K_2O \cdot M_2O$ where M is Li and/or Na is mentioned, M may be Li and the silicate may comprise:
31.5% w/w-39.4% w/w $SiO_2$,
12.3% w/w-13.7% w/w $K_2O$, and
0.3% w/w $Li_2O$.

In any embodiment where an alkali metal silicate of general formula $SiO_2 \cdot K_2O \cdot M_2O$ where M is Li and/or Na is mentioned, M may be Na and the silicate may comprise:
about 25% w/w-about 45% w/w $SiO_2$,
about 5% w/w-about 20% w/w $K_2O$, and
about 0.5% w/w-about 3% w/w $Na_2O$.

In any embodiment where an alkali metal silicate of general formula $SiO_2 \cdot K_2O \cdot M_2O$ where M is Li and/or Na is mentioned, M may be Na and the silicate may comprise:
about 30% w/w-about 40% w/w $SiO_2$,
about 10% w/w-about 15% w/w $K_2O$, and
about 0.5% w/w-about 1.5% w/w $Na_2O$.

In any embodiment where an alkali metal silicate of general formula $SiO_2 \cdot K_2O \cdot M_2O$ where M is Li and/or Na is mentioned, M may be Na and the silicate may comprise:
about 31.5% w/w-about 39.4% w/w $SiO_2$,
about 12.3% w/w-about 13.7% w/w $K_2O$, and
about 0.9% w/w-about 1.4% w/w $Na_2O$.

In any embodiment where an alkali metal silicate of general formula $SiO_2 \cdot K_2O \cdot M_2O$ where M is Li and/or Na is mentioned, M may be Na and the silicate may comprise:
25% w/w-45% w/w $SiO_2$,
5% w/w-20% w/w $K_2O$, and
0.5% w/w-3% w/w $Na_2O$.

In any embodiment where an alkali metal silicate of general formula $SiO_2 \cdot K_2O \cdot M_2O$ where M is Li and/or Na is mentioned, M may be Na and the silicate may comprise:
30% w/w-40% w/w $SiO_2$,
10% w/w-15% w/w $K_2O$, and
0.5% w/w-1.5% w/w $Na_2O$.

In any embodiment where an alkali metal silicate of general formula $SiO_2 \cdot K_2O \cdot M_2O$ where M is Li and/or Na is mentioned, M may be Na and the silicate may comprise:
31.5% w/w-39.4% w/w $SiO_2$,
12.3% w/w-13.7% w/w $K_2O$, and
0.9% w/w-1.4% w/w $Na_2O$.

In any embodiment where an alkali metal silicate of general formula $SiO_2 \cdot K_2O \cdot M_2O$ where M is Li and/or Na is mentioned there may be a 1.5-fold, 2-fold, 3-fold, 4-fold, 5-fold, 6-fold, 7-fold, 8-fold, 9-fold, 10-fold, 20-fold, 50-fold or 100-fold molar excess of $SiO_2$ with respect to $K_2O$.

In any embodiment where an alkali metal silicate of general formula $SiO_2 \cdot K_2O \cdot M_2O$ where M is Li and/or Na is mentioned there may be a 1.5-fold, 2-fold, 3-fold, 4-fold, 5-fold, 6-fold, 7-fold, 8-fold, 9-fold, 10-fold, 20-fold, 50-fold or 100-fold molar excess of $SiO_2$ with respect to $M_2O$.

In any embodiment where an alkali metal silicate of general formula $SiO_2 \cdot K_2O \cdot M_2O$ where M is Li and/or Na is mentioned, M may be Na and there may be a 1.5-fold, 2-fold, 3-fold, 4-fold, 5-fold, 6-fold, 7-fold, 8-fold, 9-fold, 10-fold, 20-fold, 50-fold or 100-fold molar excess of $SiO_2$ with respect to $Na_2O$.

In any embodiment where an alkali metal silicate of general formula $SiO_2 \cdot K_2O \cdot M_2O$ where M is Li and/or Na is mentioned, M may be Na and there may be a 1.5-fold, 2-fold, 3-fold, 4-fold, 5-fold, 6-fold, 7-fold, 8-fold, 9-fold, 10-fold, 20-fold, 50-fold or 100-fold molar excess of $K_2O$ with respect to $Na_2O$.

In any embodiment where an alkali metal silicate of general formula $SiO_2 \cdot K_2O \cdot M_2O$ where M is Li and/or Na is mentioned, there may be a 1.5-fold, 2-fold, 3-fold, 4-fold, 5-fold, 6-fold, 7-fold, 8-fold, 9-fold, 10-fold, 20-fold, 50-fold or 100-fold weight excess of $SiO_2$ with respect to $K_2O$.

In any embodiment where an alkali metal silicate of general formula $SiO_2 \cdot K_2O \cdot M_2O$ where M is Li and/or Na is mentioned, there may be a 1.5-fold, 2-fold, 3-fold, 4-fold, 5-fold, 6-fold, 7-fold, 8-fold, 9-fold, 10-fold, 20-fold, 50-fold or 100-fold weight excess of $SiO_2$ with respect to $M_2O$.

In any embodiment where an alkali metal silicate of general formula $SiO_2 \cdot K_2O \cdot M_2O$ where M is Li and/or Na is mentioned, M may be Na and there may be a 1.5-fold, 2-fold, 3-fold, 4-fold, 5-fold, 6-fold, 7-fold, 8-fold, 9-fold, 10-fold, 20-fold, 50-fold or 100-fold weight excess of $SiO_2$ with respect to $Na_2O$.

In any embodiment where an alkali metal silicate of general formula $SiO_2 \cdot K_2O \cdot M_2O$ where M is Li and/or Na is mentioned, M may be Na and there may be a 1.5-fold, 2-fold, 3-fold, 4-fold, 5-fold, 6-fold, 7-fold, 8-fold, 9-fold, 10-fold, 20-fold, 50-fold or 100-fold weight excess of $K_2O$ with respect to $Na_2O$.

In any embodiment where an alkali metal silicate of general formula $SiO_2 \cdot K_2O \cdot M_2O$ where M is Li and/or Na is mentioned, the total weight of silicate may be between about 30% w/w and about 65% w/w.

In any embodiment where an alkali metal silicate of general formula $SiO_2 \cdot K_2O \cdot M_2O$ where M is Li and/or Na is mentioned, the total weight of silicate may be between about 40% w/w and about 60% w/w.

In any embodiment where an alkali metal silicate of general formula $SiO_2 \cdot K_2O \cdot M_2O$ where M is Li and/or Na is mentioned, the total weight of silicate may be between about 50% w/w and about 60% w/w.

In any embodiment where an alkali metal silicate of general formula $SiO_2 \cdot K_2O \cdot M_2O$ where M is Li and/or Na is mentioned, the total weight of silicate may be about 65% w/w.

In any embodiment where an alkali metal silicate of general formula $SiO_2 \cdot K_2O \cdot M_2O$ where M is Li and/or Na is mentioned, the total weight of silicate may be about 60% w/w.

In any embodiment where an alkali metal silicate of general formula $SiO_2 \cdot K_2O \cdot M_2O$ where M is Li and/or Na is mentioned, the total weight of silicate may be about 55% w/w.

In any embodiment where an alkali metal silicate of general formula $SiO_2 \cdot K_2O \cdot M_2O$ where M is Li and/or Na is mentioned, the total weight of silicate may be about 50% w/w.

In any embodiment where an alkali metal silicate of general formula $SiO_2 \cdot K_2O \cdot M_2O$ where M is Li and/or Na is mentioned, the total weight of silicate may be about 40% w/w.

In any embodiment where an alkali metal silicate of general formula $SiO_2 \cdot K_2O \cdot M_2O$ where M is Li and/or Na is mentioned, the total weight of silicate may be about 30% w/w.

In any embodiment where an alkali metal silicate of general formula $SiO_2 \cdot K_2O \cdot M_2O$ where M is Li and/or Na is mentioned, the total weight of silicate may be between 30% w/w and 64.5% w/w.

In any embodiment where an alkali metal silicate of general formula $SiO_2 \cdot K_2O \cdot M_2O$ where M is Li and/or Na is mentioned, the total weight of silicate may be between 40% w/w and 60% w/w.

In any embodiment where an alkali metal silicate of general formula $SiO_2 \cdot K_2O \cdot M_2O$ where M is Li and/or Na is mentioned, the total weight of silicate may be between 50% w/w and 60% w/w.

In any embodiment where an alkali metal silicate of general formula $SiO_2 \cdot K_2O \cdot M_2O$ where M is Li and/or Na is mentioned, the total weight of silicate may be 65% w/w.

In any embodiment where an alkali metal silicate of general formula $SiO_2 \cdot K_2O \cdot M_2O$ where M is Li and/or Na is mentioned, the total weight of silicate may be 60% w/w.

In any embodiment where an alkali metal silicate of general formula $SiO_2 \cdot K_2O \cdot M_2O$ where M is Li and/or Na is mentioned, the total weight of silicate may be 55% w/w.

In any embodiment where an alkali metal silicate of general formula $SiO_2 \cdot K_2O \cdot M_2O$ where M is Li and/or Na is mentioned, the total weight of silicate may be 50% w/w.

In any embodiment where an alkali metal silicate of general formula $SiO_2 \cdot K_2O \cdot M_2O$ where M is Li and/or Na is mentioned, the total weight of silicate may be 40% w/w.

In any embodiment where an alkali metal silicate of general formula $SiO_2 \cdot K_2O \cdot M_2O$ where M is Li and/or Na is mentioned, the total weight of silicate may be 30% w/w.

Water-Soluble Aluminates

During a fire, metal aluminates may form cross-links between the various types of silicate present in a fire-resistant interlayer, improving the char flow properties of the interlayer and increasing its overall effectiveness. Such water-soluble aluminates therefore confer advantages when used to form the compositions and interlayers of the present specification.

A further embodiment is an aqueous composition for preparing a castable UV-stable fire-resistant interlayer, comprising:
- A mixed alkali metal silicate of general formula $SiO_2 \cdot K_2O \cdot M_2O$, where:
    M is Li and/or Na,
    the weight ratio of $SiO_2:K_2O$ is between about 2.5:1 and about 4.0:1, and
    the weight ratio of $SiO_2:M_2O$ is between about 2.2:0.1 and about 4.5:0.1;
- about 0.01% w/w-about 5% w/w of a water-soluble aluminate;
- about 0.5% w/w-about 5% w/w of a hydroxylated amine compound and/or quaternary ammonium salt;
- about 10% w/w-about 20% w/w of a polyhydric organic compound; and
- about 15% w/w-about 35% w/w water.

In any embodiment where a water-soluble aluminate is mentioned, the water-soluble aluminate may be selected from sodium aluminate, potassium aluminate and a quaternary ammonium aluminate (for example ammonium aluminate sulphate).

In any embodiment where a water-soluble aluminate is mentioned, the water-soluble aluminate may be sodium aluminate or potassium aluminate.

In any embodiment where a water-soluble aluminate is mentioned, the water-soluble aluminate may be sodium aluminate.

In any embodiment where a water-soluble aluminate is mentioned, the water-soluble aluminate may be potassium aluminate.

In any embodiment where a water-soluble aluminate is mentioned, the water-soluble aluminate may be present in an amount of about 0.01% w/w-about 5% w/w.

In any embodiment where a water-soluble aluminate is mentioned, the water-soluble aluminate may be present in an amount of about 0.01% w/w-about 2% w/w.

In any embodiment where a water-soluble aluminate is mentioned, the water-soluble aluminate may be present in an amount of about 0.01% w/w-about 0.5% w/w.

In any embodiment where a water-soluble aluminate is mentioned, the water-soluble aluminate may be present in an amount of about 0.01% w/w-about 0.2% w/w.

In any embodiment where a water-soluble aluminate is mentioned, the water-soluble aluminate may be present in an amount of about 0.01% w/w-about 0.15% w/w.

In any embodiment where a water-soluble aluminate is mentioned, the water-soluble aluminate may be present in an amount of about 0.01% w/w-about 0.1% w/w.

In any embodiment where a water-soluble aluminate is mentioned, the water-soluble aluminate may be present in an amount of about 0.01% w/w-about 0.08% w/w.

In any embodiment where a water-soluble aluminate is mentioned, the water-soluble aluminate may be present in an amount of about 0.1% w/w.

In any embodiment where a water-soluble aluminate is mentioned, the water-soluble aluminate may be present in an amount of about 0.08% w/w.

In any embodiment where a water-soluble aluminate is mentioned, the water-soluble aluminate may be present in an amount of 0.01% w/w-5% w/w.

In any embodiment where a water-soluble aluminate is mentioned, the water-soluble aluminate may be present in an amount of 0.01% w/w-2% w/w.

In any embodiment where a water-soluble aluminate is mentioned, the water-soluble aluminate may be present in an amount of 0.01% w/w-0.5% w/w.

In any embodiment where a water-soluble aluminate is mentioned, the water-soluble aluminate may be present in an amount of 0.01% w/w-0.2% w/w.

In any embodiment where a water-soluble aluminate is mentioned, the water-soluble aluminate may be present in an amount of 0.01% w/w-0.15% w/w.

In any embodiment where a water-soluble aluminate is mentioned, the water-soluble aluminate may be present in an amount of 0.01% w/w-0.1% w/w.

In any embodiment where a water-soluble aluminate is mentioned, the water-soluble aluminate may be present in an amount of 0.1% w/w.

In any embodiment where a water-soluble aluminate is mentioned, the water-soluble aluminate may be present in an amount of 0.08% w/w.

In any embodiment where a water-soluble aluminate is mentioned, the water-soluble aluminate may be sodium aluminate in an amount of about 0.01% w/w-about 5% w/w.

In any embodiment where a water-soluble aluminate is mentioned, the water-soluble aluminate may be sodium aluminate in an amount of about 0.01% w/w-about 2% w/w.

In any embodiment where a water-soluble aluminate is mentioned, the water-soluble aluminate may be sodium aluminate in an amount of about 0.01% w/w-about 0.5% w/w.

In any embodiment where a water-soluble aluminate is mentioned, the water-soluble aluminate may be sodium aluminate in an amount of about 0.01% w/w-about 0.2% w/w.

In any embodiment where a water-soluble aluminate is mentioned, the water-soluble aluminate may be sodium aluminate in an amount of about 0.01% w/w-about 0.15% w/w.

In any embodiment where a water-soluble aluminate is mentioned, the water-soluble aluminate may be sodium aluminate in an amount of about 0.01% w/w-about 0.1% w/w.

In any embodiment where a water-soluble aluminate is mentioned, the water-soluble aluminate may be sodium aluminate in an amount of about 0.01% w/w-about 0.08% w/w.

In any embodiment where a water-soluble aluminate is mentioned, the water-soluble aluminate may be sodium aluminate in an amount of about 0.1% w/w.

In any embodiment where a water-soluble aluminate is mentioned, the water-soluble aluminate may be sodium aluminate in an amount of about 0.08% w/w.

In any embodiment where a water-soluble aluminate is mentioned, the water-soluble aluminate may be sodium aluminate in an amount of 0.010% w/w-5% w/w.

In any embodiment where a water-soluble aluminate is mentioned, the water-soluble aluminate may be sodium aluminate in an amount of 0.01% w/w-2% w/w.

In any embodiment where a water-soluble aluminate is mentioned, the water-soluble aluminate may be sodium aluminate in an amount of 0.01% w/w-0.5% w/w.

In any embodiment where a water-soluble aluminate is mentioned, the water-soluble aluminate may be sodium aluminate in an amount of 0.01% w/w-0.2% w/w.

In any embodiment where a water-soluble aluminate is mentioned, the water-soluble aluminate may be sodium aluminate in an amount of 0.01% w/w-0.15% w/w.

In any embodiment where a water-soluble aluminate is mentioned, the water-soluble aluminate may be sodium aluminate in an amount of 0.01% w/w-0.1% w/w.

In any embodiment where a water-soluble aluminate is mentioned, the water-soluble aluminate may be sodium aluminate in an amount of 0.01% w/w-0.08% w/w.

In any embodiment where a water-soluble aluminate is mentioned, the water-soluble aluminate may be sodium aluminate in an amount of 0.1% w/w.

In any embodiment where a water-soluble aluminate is mentioned, the water-soluble aluminate may be sodium aluminate in an amount of 0.08% w/w.

In any embodiment where a water-soluble aluminate is mentioned, the molar ratio of silicon to aluminium may be between about 50:1 and about 300:1.

In any embodiment where a water-soluble aluminate is mentioned, the molar ratio of silicon to aluminium may be between about 50:1 and about 200:1.

In any embodiment where a water-soluble aluminate is mentioned, the molar ratio of silicon to aluminium may be between about 90:1 and about 150:1.

In any embodiment where a water-soluble aluminate is mentioned, the molar ratio of silicon to aluminium may be about 90:1.

In any embodiment where a water-soluble aluminate is mentioned, the molar ratio of silicon to aluminium may be about 150:1.

In any embodiment where a water-soluble aluminate is mentioned, the molar ratio of silicon to aluminium may be between 50:1 and 300:1.

In any embodiment where a water-soluble aluminate is mentioned, the molar ratio of silicon to aluminium may be between 50:1 and 200:1.

In any embodiment where a water-soluble aluminate is mentioned, the molar ratio of silicon to aluminium may be between 90:1 and 150:1.

In any embodiment where a water-soluble aluminate is mentioned, the molar ratio of silicon to aluminium may be 90:1.

In any embodiment where a water-soluble aluminate is mentioned, the molar ratio of silicon to aluminium may be 150:1.

Hydroxylated Amine and Quaternary Ammonium Compounds

Hydroxylated amine compounds are any compounds with a basic amino functionality as well as a hydroxyl group. Example hydroxylated amine compounds include hydroxylamine, ethanolamine, propanolamine and other suitable organic compounds.

Quaternary ammonium salts include ammonium hydroxide and tetra alkyl ammonium hydroxides such as tetramethyl ammonium hydroxide (TMAH) or tetraethyl ammonium hydroxide.

Hydroxylated amine compounds and/or quaternary ammonium compounds were found to allow a reduction in the amount of water in the aqueous compositions and interlayers when in combination with the other components of the aqueous compositions described herein, allowing the use of simple casting methods during manufacture.

The amount of hydroxylated amine compounds and/or quaternary ammonium compounds and the ratio of therebetween can have a particular influence on the fire performance of the resultant laminate. Without being bound by theory it appears that these compounds play an important role in holding the water in the gel matrix and controlling the release of the water in a fire situation, so that small changes can have a significant change in fire performance.

In any embodiment where a hydroxylated amine compound and/or quaternary ammonium salt is mentioned, the hydroxylated amine compound and/or quaternary ammonium salt may be a combination of a hydroxylated amine compound and a quaternary ammonium salt.

In any embodiment where a hydroxylated amine compound and/or quaternary ammonium salt is mentioned, the hydroxylated amine compound and/or quaternary ammonium salt may be a hydroxylated amine compound.

In any embodiment where a hydroxylated amine compound and/or quaternary ammonium salt is mentioned, the hydroxylated amine compound and/or quaternary ammonium salt may be a quaternary ammonium salt.

In any embodiment where a hydroxylated amine compound and/or quaternary ammonium salt is mentioned, the hydroxylated amine compound and/or quaternary ammonium salt may be selected from ethanolamine, ammonium hydroxide and a tetra alkyl ammonium hydroxide.

In any embodiment where a hydroxylated amine compound and/or quaternary ammonium salt is mentioned, the hydroxylated amine compound and/or quaternary ammonium salt may be selected from ethanolamine, ammonium hydroxide, tetramethyl ammonium hydroxide and tetraethyl ammonium hydroxide.

In any embodiment where a hydroxylated amine compound and/or quaternary ammonium salt is mentioned, the hydroxylated amine compound and/or quaternary ammonium salt may be selected from ethanolamine and tetra methyl ammonium hydroxide.

In any embodiment where a hydroxylated amine compound and/or quaternary ammonium salt is mentioned, the hydroxylated amine compound and/or quaternary ammonium salt may be a mixture of ethanolamine and tetra methyl ammonium hydroxide.

In any embodiment where a hydroxylated amine compound and/or quaternary ammonium salt is mentioned, the hydroxylated amine compound and/or quaternary ammonium salt may be ethanolamine.

In any embodiment where a hydroxylated amine compound and/or quaternary ammonium salt is mentioned, the hydroxylated amine compound and/or quaternary ammonium salt may be tetra methyl ammonium hydroxide.

In any embodiment where a hydroxylated amine compound and/or quaternary ammonium salt is mentioned, the hydroxylated amine compound and/or quaternary ammonium salt may be ethanolamine in an amount of about 0.01% w/w-about 0.5% w/w.

In any embodiment where a hydroxylated amine compound and/or quaternary ammonium salt is mentioned, the hydroxylated amine compound and/or quaternary ammonium salt may be ethanolamine in an amount of about 0.5% w/w-about 5% w/w.

In any embodiment where a hydroxylated amine compound and/or quaternary ammonium salt is mentioned, the hydroxylated amine compound and/or quaternary ammonium salt may be ethanolamine in an amount of about 0.5% w/w-about 1.5% w/w.

In any embodiment where a hydroxylated amine compound and/or quaternary ammonium salt is mentioned, the hydroxylated amine compound and/or quaternary ammonium salt may be ethanolamine in an amount of about 1% w/w.

In any embodiment where a hydroxylated amine compound and/or quaternary ammonium salt is mentioned, the hydroxylated amine compound and/or quaternary ammonium salt may be ethanolamine in an amount of 0.01% w/w-0.5% w/w.

In any embodiment where a hydroxylated amine compound and/or quaternary ammonium salt is mentioned, the hydroxylated amine compound and/or quaternary ammonium salt may be ethanolamine in an amount of 0.5% w/w-5% w/w.

In any embodiment where a hydroxylated amine compound and/or quaternary ammonium salt is mentioned, hydroxylated amine compound and/or quaternary ammonium salt may be ethanolamine in an amount of 0.5% w/w-1.5% w/w.

In any embodiment where a hydroxylated amine compound and/or quaternary ammonium salt is mentioned, the hydroxylated amine compound and/or quaternary ammonium salt may be ethanolamine in an amount of 1.1% w/w.

Polyhydric Organic Compounds

Polyhydric alcohol compounds include organic liquids miscible with water at all proportions. Suitable polyhydric alcohol compounds include simple polyols like glycerol and ethylene glycol, as well as sugar derived alcohols such as xylitol and sorbitol.

In any embodiment where a polyhydric alcohol compound is mentioned, the polyhydric alcohol compound may be selected from glycerol, ethylene glycol, xylitol and sorbitol.

In any embodiment where a polyhydric alcohol compound is mentioned, the polyhydric alcohol compound may be selected from xylitol and glycerol.

In any embodiment where a polyhydric alcohol compound is mentioned, the polyhydric alcohol compound may be glycerol.

In any embodiment where a polyhydric alcohol compound is mentioned, the polyhydric alcohol compound may be xylitol.

In any embodiment where a polyhydric alcohol compound is mentioned, the polyhydric alcohol compound may be a xylitol and glycerol (i.e. a mixture of the two polyhydric alcohol compounds).

In any embodiment where a polyhydric alcohol compound is mentioned, the polyhydric alcohol compound may be present in an amount of about 10% w/w-about 20% w/w.

In any embodiment where a polyhydric alcohol compound is mentioned, the polyhydric alcohol compound may be present in an amount of about 15% w/w-about 20% w/w.

In any embodiment where a polyhydric alcohol compound is mentioned, the polyhydric alcohol compound may be xylitol in an amount of about 1% w/w-about 10% w/w.

In any embodiment where a polyhydric alcohol compound is mentioned, the polyhydric alcohol compound may be xylitol in an amount of about 1% w/w-about 6% w/w.

In any embodiment where a polyhydric alcohol compound is mentioned, the polyhydric alcohol compound may be xylitol in an amount of about 6% w/w.

In any embodiment where a polyhydric alcohol compound is mentioned, the polyhydric alcohol compound may be xylitol in an amount of about 5.5% w/w.

In any embodiment where a polyhydric alcohol compound is mentioned, the polyhydric alcohol compound may be glycerol in an amount of about 5% w/w-about 20% w/w.

In any embodiment where a polyhydric alcohol compound is mentioned, the polyhydric alcohol compound may be glycerol in an amount of about 10% w/w-about 20% w/w.

In any embodiment where a polyhydric alcohol compound is mentioned, the polyhydric alcohol compound may be glycerol in an amount of about 10% w/w-about 20% w/w.

In any embodiment where a polyhydric alcohol compound is mentioned, the polyhydric alcohol compound may be glycerol in an amount of about 10% w/w-about 16% w/w.

In any embodiment where a polyhydric alcohol compound is mentioned, the polyhydric alcohol compound may be glycerol in an amount of about 16% w/w.

In any embodiment where a polyhydric alcohol compound is mentioned, the polyhydric alcohol compound may be glycerol in an amount of about 15.9% w/w.

In any embodiment where a polyhydric alcohol compound is mentioned, the polyhydric alcohol compound may be about 10% w/w-about 20% w/w of glycerol and 0% w/w-about 10% w/w xylitol.

In any embodiment where a polyhydric alcohol compound is mentioned, the polyhydric alcohol compound may be about 10% w/w-about 16% w/w of glycerol and 0% w/w-about 6% w/w xylitol.

In any embodiment where a polyhydric alcohol compound is mentioned, the polyhydric alcohol compound may be present in an amount of 10% w/w-20% w/w.

In any embodiment where a polyhydric alcohol compound is mentioned, the polyhydric alcohol compound may be present in an amount of 15% w/w-20% w/w.

In any embodiment where a polyhydric alcohol compound is mentioned, the polyhydric alcohol compound may be xylitol in an amount of 1% w/w-10% w/w.

In any embodiment where a polyhydric alcohol compound is mentioned, the polyhydric alcohol compound may be xylitol in an amount of 1% w/w-6% w/w.

In any embodiment where a polyhydric alcohol compound is mentioned, the polyhydric alcohol compound may be xylitol in an amount of 6% w/w.

In any embodiment where a polyhydric alcohol compound is mentioned, the polyhydric alcohol compound may be xylitol in an amount of 5.5% w/w.

In any embodiment where a polyhydric alcohol compound is mentioned, the polyhydric alcohol compound may be glycerol in an amount of 5% w/w-20% w/w.

In any embodiment where a polyhydric alcohol compound is mentioned, the polyhydric alcohol compound may be glycerol in an amount of 10% w/w-20% w/w.

In any embodiment where a polyhydric alcohol compound is mentioned, the polyhydric alcohol compound may be glycerol in an amount of 10% w/w-20% w/w.

In any embodiment where a polyhydric alcohol compound is mentioned, the polyhydric alcohol compound may be glycerol in an amount of 10% w/w-16% w/w.

In any embodiment where a polyhydric alcohol compound is mentioned, the polyhydric alcohol compound may be glycerol in an amount of 16% w/w.

In any embodiment where a polyhydric alcohol compound is mentioned, the polyhydric alcohol compound may be glycerol in an amount of 15.9% w/w.

In any embodiment where a polyhydric alcohol compound is mentioned, the polyhydric alcohol compound may be 10% w/w-20% w/w of glycerol and 0%-10% w/w xylitol.

In any embodiment where a polyhydric alcohol compound is mentioned, the polyhydric alcohol compound may be 10% w/w-16% w/w of glycerol and 0% w/w-6% w/w xylitol.

In any embodiment where a polyhydric alcohol compound is mentioned, the polyhydric alcohol compound may be present in an amount of about <20% w/w.

In any embodiment where a polyhydric alcohol compound is mentioned, the polyhydric alcohol compound may be present in an amount of <20% w/w.

Water Levels

The water levels of the aqueous compositions contribute both to interlayer thermal resistance (by evaporating in a fire and consuming heat energy) and ease of manufacture (by conferring suitable viscosity so that the aqueous compositions can be poured or pumped into pre-made glazing laminate templates and then set by mild curing methods, rather than requiring separate coating on a single piece of glass, evaporation of excess water and stepwise construction).

In any embodiment where water is mentioned, the water may be present in an amount of between about 15% w/w-about 35% w/w.

In any embodiment where water is mentioned, the water may be present in an amount of between about 18% w/w-about 33% w/w.

In any embodiment where water is mentioned, the water may be present in an amount of between about 27% w/w-about 33% w/w.

In any embodiment where water is mentioned, the water may be present in an amount of about 30% w/w.

In any embodiment where water is mentioned, the water may be present in an amount of about 28% w/w.

In any embodiment where water is mentioned, the water may be present in an amount of about 25% w/w.

In any embodiment where water is mentioned, the water may be present in an amount of about 20% w/w.

In any embodiment where water is mentioned, the water may be present in an amount of about 19% w/w.

In any embodiment where water is mentioned, the water may be present in an amount of about 18% w/w.

In any embodiment where water is mentioned, the water may be present in an amount of about 17% w/w.

In any embodiment where water is mentioned, the water may be present in an amount of about 16% w/w.

In any embodiment where water is mentioned, the water may be present in an amount of about 15% w/w.

In any embodiment where water is mentioned, the water may be present in an amount of between 15% w/w-35% w/w.

In any embodiment where water is mentioned, the water may be present in an amount of between 18% w/w-33% w/w.

In any embodiment where water is mentioned, the water may be present in an amount of between 27% w/w-33% w/w.

In any embodiment where water is mentioned, the water may be present in an amount of 30% w/w.

In any embodiment where water is mentioned, the water may be present in an amount of 28% w/w.

In any embodiment where water is mentioned, the water may be present in an amount of 28.5% w/w.

In any embodiment where water is mentioned, the water may be present in an amount of 28.3% w/w.

In any embodiment where water is mentioned, the water may be present in an amount of 26.3% w/w.

In any embodiment where water is mentioned, the water may be present in an amount of about 25% w/w.

In any embodiment where water is mentioned, the water may be present in an amount of 20% w/w.

In any embodiment where water is mentioned, the water may be present in an amount of 19% w/w.

In any embodiment where water is mentioned, the water may be present in an amount of 18% w/w.

In any embodiment where water is mentioned, the water may be present in an amount of 17% w/w.

In any embodiment where water is mentioned, the water may be present in an amount of 16% w/w.

In any embodiment where water is mentioned, the water may be present in an amount of 15% w/w.

Specific Compositions

A further embodiment is an aqueous composition for preparing a castable UV-stable fire-resistant interlayer, comprising:

A mixed alkali metal silicate of general formula $SiO_2 \cdot K_2O \cdot M_2O$, where M is Na and the weight ratio of $SiO_2:K_2O:Na_2O$ is about 3:1:0.1;

0.01% w/w-about 0.1% w/w sodium aluminate;

about 0.5% w/w-about 5% w/w ethanolamine;

0% w/w-about 10% w/w of xylitol;

about 10% w/w-about 20% w/w of glycerol; and about 15% w/w-about 35% w/w water.

A further embodiment is an aqueous composition for preparing a castable UV-stable fire-resistant interlayer, comprising:

A mixed alkali metal silicate of general formula $SiO_2 \cdot K_2O \cdot M_2O$, where M is Na and the silicate comprises:

about 15% w/w-about 45% w/w $SiO_2$, about 5% w/w-about 20% w/w $K_2O$, and about 0.5% w/w-about 3% w/w $Na_2O$;

about 0.01% w/w-about 0.1% w/w sodium aluminate;

about 0.5% w/w-about 5% w/w ethanolamine;

0% w/w-about 10% w/w of xylitol;

about 10% w/w-about 20% w/w of glycerol; and about 15% w/w-about 35% w/w water.

A further embodiment is an aqueous composition for preparing a castable UV-stable fire-resistant interlayer, comprising:

An alkali metal silicate of general formula $SiO_2 \cdot K_2O \cdot M_2O$, where M is Na and the silicate comprises:
  about 30% w/w-about 40% w/w $SiO_2$,
  about 10% w/w-about 15% w/w $K_2O$, and
  about 0.5% w/w-about 1.5% w/w $Na_2O$;
about 0.1% w/w sodium aluminate;
about 1% w/w ethanolamine;
0% w/w-about 6% w/w of xylitol;
about 10% w/w-about 16% w/w of glycerol; and
about 15% w/w-about 35% w/w water.

A further embodiment is an aqueous composition for preparing a castable UV-stable fire-resistant interlayer, comprising:
An alkali metal silicate of general formula $SiO_2 \cdot K_2O \cdot M_2O$, where M is Na and the silicate comprises:
  about 40% w/w $SiO_2$,
  about 14% w/w $K_2O$, and
  about 1.3% w/w $Na_2O$;
about 0.1% w/w sodium aluminate;
about 1% w/w ethanolamine;
about 16% w/w of glycerol; and
about 28% w/w water.

A further embodiment is any aqueous composition with the components recited in the Examples (for example any of Examples C-H, J-M or O-AB in Table 1, or any of Examples T, U, V, W or X in Table 1).

Preparation of Aqueous Compositions

A further embodiment is a process for the preparation of an aqueous composition for preparing a castable UV-stable fire-resistant interlayer comprising:
A mixed alkali metal silicate of general formula $SiO_2 \cdot K_2O \cdot M_2O$, where:
  M is Li and/or Na,
  the weight ratio of $SiO_2:K_2O$ is between about 2.5:1 and about 4.0:1, and
  the weight ratio of $SiO_2:M_2O$ is between about 2.2:0.1 and about 4.5:0.1;
about 0.5% w/w-about 5% w/w of a hydroxylated amine compound and/or quaternary ammonium salt;
about 10% w/w-about 20% w/w of a polyhydric organic compound; and
about 15% w/w-about 35% w/w water;
the process comprising:
  (a) Preparing a silica solution by mixing a suitable silica source with a hydroxylated amine compound and/or quaternary ammonium salt and a polyhydric organic compound in water;
  (b) Optionally reducing the water content of the silica solution;
  (c) Preparing an alkali metal hydroxide solution by mixing potassium hydroxide, lithium hydroxide and/or sodium hydroxide in water;
  (d) Mixing the silica solution and the alkali metal hydroxide solution together; and optionally,
  (e) Heating the mixture until the reaction is complete.

When it is mentioned that a reaction should be "complete", this means that the mixture is ready for pouring into a laminate glazing casting mould, prior to curing to form an interlayer. A skilled person can judge the time necessary to reach this stage.

A further embodiment is an aqueous composition for preparing a castable UV-stable fire-resistant interlayer obtainable by a process comprising:
  a) Preparing a silica solution by mixing a suitable silica source with a hydroxylated amine compound and/or quaternary ammonium salt and a polyhydric organic compound in water;
  (b) Optionally reducing the water content of the silica solution;
  (c) Preparing an alkali metal hydroxide solution by mixing potassium hydroxide, sodium; hydroxide, and, if required, a water-soluble aluminate in water;
  (d) Mixing the silica solution and the alkali metal hydroxide solution together; and optionally
  (e) Heating the mixture until the reaction is complete.

Fire-Resistant Interlayers

A further embodiment is a fire-resistant interlayer prepared from an aqueous composition comprising:
A mixed alkali metal silicate of general formula $SiO_2 \cdot K_2O \cdot M_2O$, where:
  M is Li and/or Na,
  the weight ratio of $SiO_2:K_2O$ is between about 2.5:1 and about 4.0:1, and
  the weight ratio of $SiO_2:M_2O$ is between about 2.2:0.1 and about 4.5:0.1;
about 0.5% w/w-about 5% w/w of a hydroxylated amine compound and/or quaternary ammonium salt;
about 10% w/w-about 20% w/w of a polyhydric organic compound; and
about 15% w/w-about 35% w/w water.

In any embodiment where an interlayer is mentioned, the interlayer may comprise one or more layers.

In any embodiment where an interlayer is mentioned, the interlayer may comprise one layer.

In any embodiment where an interlayer is mentioned, the interlayer may comprise two layers.

In any embodiment where an interlayer is mentioned, the interlayer may comprise three layers.

In any embodiment where an interlayer is mentioned, the interlayer may comprise two or three layers.

In any embodiment where an interlayer is mentioned, the interlayer may comprise up to twenty layers.

In any embodiment where an interlayer is mentioned, the interlayer may comprise multi layers.

In any embodiment where an interlayer is mentioned, the interlayer may be between about 0.1 mm and about 10 mm in thickness.

In any embodiment where an interlayer is mentioned, the interlayer may be between about 0.2 mm and about 5 mm in thickness.

In any embodiment where an interlayer is mentioned, the interlayer may be between about 0.5 mm and about 5 mm in thickness.

In any embodiment where an interlayer is mentioned, the interlayer may be between about 0.3 mm and about 1.5 mm in thickness.

In any embodiment where an interlayer is mentioned, the interlayer may be between about 0.3 mm and about 8 mm in thickness.

In any embodiment here an interlayer is mentioned, the interlayer may be about 1 mm in thickness.

In any embodiment where an interlayer is mentioned, the interlayer may be about 1.1 mm in thickness.

In any embodiment where an interlayer is mentioned, the interlayer may be about 1.6 mm in thickness.

In any embodiment where an interlayer is mentioned, the interlayer may be between 0.1 mm and 10 mm in thickness.

In any embodiment where an interlayer is mentioned, the interlayer may be between 0.2 mm and 5 mm in thickness.

In any embodiment where an interlayer is mentioned, the interlayer may be between 0.5 mm and 5 mm in thickness.

In any embodiment where an interlayer is mentioned, the interlayer may be between 0.3 mm and 1.5 mm in thickness.

In any embodiment where an interlayer is mentioned, the interlayer may be between 0.3 mm and 8 mm in thickness.

In any embodiment where an interlayer is mentioned, the interlayer may be 0.38 mm in thickness.

In any embodiment where an interlayer is mentioned, the interlayer may be 0.76 mm in thickness.

In any embodiment where an interlayer is mentioned, the interlayer may be 1 mm in thickness.

In any embodiment where an interlayer is mentioned, the interlayer may be 1.1 mm in thickness.

In any embodiment where an interlayer is mentioned, the interlayer may be 1.6 mm in thickness.

Preparation of Fire-Resistant Interlayers

A further embodiment is a fire-resistant interlayer prepared by curing an aqueous composition comprising:

A mixed alkali metal silicate of general formula $SiO_2 \cdot K_2O \cdot M_2O$, where:
M is Li and/or Na,
the weight ratio of $SiO_2:K_2O$ is between about 2.5:1 and about 4.0:1, and
the weight ratio of $SiO_2:M_2O$ is between about 2.2:0.1 and about 4.5:0.1;
about 0.5% w/w-about 5% w/w of a hydroxylated amine compound and/or quaternary ammonium salt;
about 10% w/w-about 20% w/w of a polyhydric organic compound; and
about 15% w/w-about 35% w/w water.

"Curing" is any process by which an aqueous composition is converted to a fire-resistant interlayer.

Curing the aqueous compositions of this specification to form fire-resistant interlayers can be accomplished at room temperature, optionally with heating (which may be gentle) to speed up the curing process. As already explained, this leads to distinct advantages of the present technology since specialist curing or evaporation equipment is not needed, reducing the capital costs of manufacture.

In any embodiment where there is a fire-resistant interlayer prepared by curing an aqueous composition, the curing may be performed thermally at an elevated temperature.

In any embodiment where there is a fire-resistant interlayer prepared by curing an aqueous composition, the curing may be performed thermally under normal atmospheric conditions.

In any embodiment where there is a fire-resistant interlayer prepared by curing an aqueous composition, the curing may be performed by heating.

In any embodiment where there is a fire-resistant interlayer prepared by curing an aqueous composition, the curing may be performed by heating under normal atmospheric conditions.

In any embodiment where there is a fire-resistant interlayer prepared by curing an aqueous composition, the curing of the resultant laminate may be performed by heating at about 30° C.-about 105° C. under normal atmospheric conditions on a suitable flat bed or rack.

Glazing Laminates

A further embodiment is a glazing laminate comprising:
a first pane and a second pane, which may be the same or different; and
a fire resistant interlayer between the first pane and the second pane;

Where the fire-resistant interlayer is prepared by curing an aqueous composition comprising:
A mixed alkali metal silicate of general formula $SiO_2 \cdot K_2O \cdot M_2O$, where:
M is Li and/or Na,
the weight ratio of $SiO_2:K_2O$ is between about 2.5:1 and about 4.0:1, and
the weight ratio of $SiO_2:M_2O$ is between about 2.2:0.1 and about 4.5:0.1;
about 0.5% w/w-about 5% w/w of a hydroxylated amine compound and/or quaternary ammonium salt;
about 10% w/w-about 20% w/w of a polyhydric organic compound; and
about 15% w/w-about 35% w/w water.

Preparation of Glazing Laminates

A further embodiment is a process for the manufacture of a glazing laminate comprising:
a first pane and a second pane, which may be the same or different; and
a fire resistant interlayer between the first pane and the second pane;

Where the fire-resistant interlayer is prepared by curing an aqueous composition comprising:
A mixed alkali metal silicate of general formula $SiO_2 \cdot K_2O \cdot M_2O$, where:
M is Li and/or Na,
the weight ratio of $SiO_2:K_2O$ is between about 2.5:1 and about 4.0:1, and
the weight ratio of $SiO_2:M_2O$ is between about 2.2:0.1 and about 4.5:0.1;
about 0.5% w/w-about 5% w/w of a hydroxylated amine compound and/or quaternary ammonium salt;
about 10% w/w-about 20% w/w of a polyhydric organic compound; and
about 15% w/w-about 35% w/w water;
the process comprising:
(a) Providing a first pane and a second pane;
(b) Partially assembling the glazing laminate by spacing apart the first pane and second pane and holding them in position with a seal which together with the panes defines an internal space;
(c) Delivering an aqueous composition comprising:
A mixed alkali metal silicate of general formula $SiO_2 \cdot K_2O \cdot M_2O$, where:
M is Li and/or Na,
the weight ratio of $SiO_2:K_2O$ is between about 2.5:1 and about 4.0:1, and
the weight ratio of $SiO_2:M_2O$ is between about 2.2:0.1 and about 4.5:0.1;
about 0.5% w/w-about 5% w/w of a hydroxylated amine compound and/or quaternary ammonium salt;
about 10% w/w-about 20% w/w of a polyhydric organic compound; and
about 15% w/w-about 35% w/w water into the internal space through the opening in the seal;
(d) Closing the opening in the seal;
(e) Curing the aqueous composition to form a fire-resistant interlayer; and optionally;
(f) Removing the seal.

Glazing Units

A further embodiment is a glazing unit comprising:
a first pane and a second pane, which may be the same or different;
a fire resistant interlayer between the first pane and the second pane; and
a seal which together with the first pane and the second pane encloses the fire-resistant interlayer;

Where the fire-resistant interlayer is prepared by curing an aqueous composition comprising:
A mixed alkali metal silicate of general formula $SiO_2 \cdot K_2O \cdot M_2O$, where:
M is Li and/or Na,
the weight ratio of $SiO_2:K_2O$ is between about 2.5:1 and about 4.0:1, and
the weight ratio of $SiO_2:M_2O$ is between about 2.2:0.1 and about 4.5:0.1;
about 0.5% w/w-about 5% w/w of a hydroxylated amine compound and/or quaternary ammonium salt;
about 10% w/w-about 20% w/w of a polyhydric organic compound; and
about 15% w/w-about 35% w/w water.

Preparation of Glazing Units

A further embodiment is a process for the manufacture of a glazing unit comprising:
a first pane and a second pane, which may be the same or different;
a fire resistant interlayer between the first pane and the second pane; and
a seal which together with the first pane and the second pane encloses the fire-resistant interlayer.
Where the fire-resistant interlayer is prepared by curing an aqueous composition comprising:
A mixed alkali metal silicate of general formula $SiO_2 \cdot K_2O \cdot M_2O$, where:
M is Li and/or Na,
the weight ratio of $SiO_2:K_2O$ is between about 2.5:1 and about 4.0:1, and
the weight ratio of $SiO_2:M_2O$ is between about 2.2:0.1 and about 4.5:0.1;
about 0.5% w/w-about 5% w/w of a hydroxylated amine compound and/or quaternary ammonium salt;
about 10% w/w-about 20% w/w of a polyhydric organic compound; and
about 15% w/w-about 35% w/w water
the process comprising:
(a) Providing a first pane and a second pane;
(b) Partially assembling the glazing unit by spacing apart the first pane and second pane and holding them in position with a seal which together with the panes defines an internal space;
(c) Delivering an aqueous composition comprising:
A mixed alkali metal silicate of general formula $SiO_2 \cdot K_2O \cdot M_2O$, where:
M is Li and/or Na,
the weight ratio of $SiO_2:K_2O$ is between about 2.5:1 and about 4.0:1, and
the weight ratio of $SiO_2:M_2O$ is between about 2.2:0.1 and about 4.5:0.1;
about 0.5% w/w-about 5% w/w of a hydroxylated amine compound and/or quaternary ammonium salt;
about 10% w/w-about 20% w/w of a polyhydric organic compound; and
about 15% w/w-about 35% w/w water into the internal space through the opening in the seal;
(d) Closing the opening in the seal; and
(e) Curing the aqueous composition to form a fire-resistant interlayer.

Panes

The use of a suitable pane in a glazing laminate or glazing unit allows the passage of light into enclosed spaces and enhances visibility and therefore safety. Panes provide support for the glazing unit as well as transparency in some cases.

Panes may be any suitable shape (for instance, square, rectangular, triangular, circular etc.), or may be dimensioned to suit the application, and shaped irregularly as required. Panes may be of varying thickness or size (e.g. perimeter size). Panes may adopt various curvatures (e.g. flat or arched) and may exhibit various degrees of transparency. Panes may be patterned or non-patterned, coloured or non-coloured.

In any embodiment where a pane is mentioned, "pane" may refer independently to the "first pane" and/or the "second pane". References to "first pane" and "second pane" are specific to that pane only.

In any embodiment where a pane is mentioned, the pane may be transparent.

In any embodiment where a pane is mentioned, the pane may be translucent. A translucent pane permits the transmission of light but diffuses it. An example of a translucent pane is a frosted pane.

In any embodiment where a pane is mentioned, the pane may be opaque.

In any embodiment where a pane is mentioned, the pane may be non-coloured.

In any embodiment where a pane is mentioned, the pane may be coloured.

In any embodiment where a pane is mentioned, the pane may be mirrored.

In any embodiment where a pane is mentioned, the pane may be patterned.

In any embodiment where a pane is mentioned, the pane may be a low iron grade such as 'extra white'.

In any embodiment where a pane is mentioned, the pane may be ultra-clear.

In any embodiment where a pane is mentioned, the pane may be transparent, translucent, opaque, non-coloured, coloured, mirrored, patterned, extra white, 'low iron' or ultra-clear.

In any embodiment where a pane is mentioned, the pane may comprise a combination of regions which are independently transparent, translucent, opaque, non-coloured, coloured, mirrored, patterned, extra white, or ultra-clear.

In any embodiment where a pane is mentioned, the pane may comprise float glass.

In any embodiment where a pane is mentioned, the pane may consist of float glass.

In any embodiment where a pane is mentioned, the pane may comprise soda-lime silicate glass.

In any embodiment where a pane is mentioned, the pane may comprise toughened soda-lime silicate glass.

In any embodiment where a pane is mentioned, the pane may comprise safety (toughened) soda-lime silicate glass.

In any embodiment where a pane is mentioned, the pane may be flat.

In any embodiment where a pane is mentioned, the pane may be a laminate (i.e. comprising multiple layers).

In any embodiment where a pane is mentioned, the pane may be a sheet.

In any embodiment where a pane is mentioned, the pane may be curved.

In any embodiment where a pane is mentioned, the pane may be rectangular.

In any embodiment where a pane is mentioned, the pane may have a thickness between about 1 mm and about 50 mm.

In any embodiment where a pane is mentioned, the pane may have a thickness between about 1 mm and about 12 mm.

In any embodiment where a pane is mentioned, the pane may have a thickness between about 1 mm and about 10 mm.

In any embodiment where a pane is mentioned, the pane may have a thickness between about 1 mm and about 8 mm.

In any embodiment where a pane is mentioned, the pane may have a thickness between about 1.5 mm and about 5 mm.

In any embodiment where a pane is mentioned, the pane may have a thickness of about 5.8 mm.

In any embodiment where a pane is mentioned, the pane may have a thickness of about 5.9 mm.

In any embodiment where a pane is mentioned, the pane may have a thickness of about 3 mm.

In any embodiment where a pane is mentioned, the pane may have a thickness of about 2.8 mm.

In any embodiment where a pane is mentioned, the pane may have a thickness between 1 mm and 12 mm.

In any embodiment where a pane is mentioned, the pane may have a thickness between 1 mm and 10 mm.

In any embodiment where a pane is mentioned, the pane may have a thickness between 1 mm and 8 mm.

In any embodiment where a pane is mentioned, the pane may have a thickness between 1.5 mm and 5 mm.

In any embodiment where a pane is mentioned, the pane may have a thickness of 5.8 mm.

In any embodiment where a pane is mentioned, the pane may have a thickness of 5.9 mm.

In any embodiment where a pane is mentioned, the pane may have a thickness of 3 mm.

In any embodiment where a pane is mentioned, the pane may have a thickness of 2.8 mm.

In any embodiment where a pane is mentioned, the pane may be float glass with a thickness of about 2.8 mm.

In any embodiment where a pane is mentioned, the pane may be float glass with a thickness of 2.8 mm.

In any embodiment where a glazing laminate or glazing unit is mentioned, the first pane and the second pane may consist of float glass with a thickness between about 1.5 mm and about 5 mm and the interlayer may be between about 0.5 mm and about 5 mm in thickness.

In any embodiment where a glazing laminate or glazing unit is mentioned, the first pane and the second pane may consist of float glass with a thickness between about 2 mm and about 4 mm and the interlayer may be between about 1 mm and about 2 mm in thickness.

In any embodiment where a glazing laminate or glazing unit is mentioned, the first pane and the second pane may consist of float glass with a thickness between about 2 mm and about 4 mm and the interlayer may be between about 1 mm and about 2 mm in thickness.

Seals

A "seal" is any element or means which can be arranged to define an internal space in a glazing laminate or glazing unit and may assist to form an essentially airtight or watertight internal space. Seals may be positioned in any suitable position relative to the outer edge of the panes they are arranged with. Panes may overlap or overhang a seal.

In glazing laminates, seals may be temporarily used to construct the laminate but may then be removed during installation.

Seals may be any suitable dimension, for example elongate. Seals may be flexible and may be moulded into any desired shape, for example being adapted to complement a given pane or glazing laminate or glazing unit geometry (for example being substantially rectangular where the pane or glazing unit is rectangular).

In any embodiment where a seal is mentioned, the seal may be an essentially airtight seal. An essentially airtight seal is one that permits only minimal gas exchange, such that if increased pressure is generated in the internal space there is a pressure build up.

In any embodiment where a seal is mentioned, the seal may be an airtight seal. An airtight seal permits no measurable gas exchange.

In any embodiment where a seal is mentioned, the seal may be non-porous.

Essentially airtight, airtight and non-porous seals do not permit (or may essentially prevent) the ingress of air or moisture which may affect elements enclosed in an internal space.

In any embodiment where a seal is mentioned, the seal may comprise a polysulphide polymer.

In any embodiment where a seal is mentioned, the seal may comprise a polyurethane polymer.

In any embodiment where a seal is mentioned, the seal may comprise a butyl polymer.

In any embodiment where a seal is mentioned, the seal may comprise a silicone polymer.

In any embodiment where a seal is mentioned, the seal may comprise a silyl modified polyether polymer (i.e. an MS polymer).

In any embodiment where a seal is mentioned, the seal may comprise a silyl modified polyurethane polymer (i.e. a SPUR polymer).

In any embodiment where a seal is mentioned, the seal may comprise acrylic tape (for example foamed acrylic tape or non-foamed acrylic tape.

In any embodiment where a seal is mentioned, the seal may comprise closed cell foam tape.

In any embodiment where a seal is mentioned, the seal may comprise 3M® VHB® (very high bonding) tape.

In any embodiment where a seal is mentioned, the seal may a self-adhesive aluminium tape.

In any embodiment where tape is used to seal a glazing laminate, it may only be present during preparation and shipping, and may be removed after installation in e.g. a suitable frame.

In any embodiment where a seal is mentioned, the seal may comprise a polysulphide polymer, a polyurethane polymer, a butyl polymer, a silicone polymer, a silyl modified polyether polymer or a silyl modified polyurethane polymer.

In any embodiment where a seal is mentioned, the seal may be a peripheral seal. "Peripheral" means that a given element (for example a seal) is in the edge region of an element (for example a pane or glazing unit).

In any embodiment where a seal is mentioned, the seal may be a perimeter seal. A "perimeter seal" is one which extends along the outer edge of at least one pane, for example both panes where there is a first pane and a second pane. Such a seal provides additional protection for the edges of the pane, which helps maintain the integrity of the pane during normal use. A perimeter seal may enclose the outer edge of at least one pane, for example both panes where there is a first pane and a second pane.

In any embodiment where a seal is mentioned, the seal may be a perimeter seal which encloses the outer edge of any pane (for example a first pane and a second pane).

Any embodiment may comprise a plurality of seals, for example a first (or primary) seal and a second (or secondary) seal.

Uses

A further embodiment is the use of a glazing laminate comprising:
- a first pane and a second pane, which may be the same or different; and
- a fire resistant interlayer between the first pane and the second pane;

Where the fire-resistant interlayer is prepared from an aqueous composition comprising:
- A mixed alkali metal silicate of general formula $SiO_2 \cdot K_2O \cdot M_2O$, where:
  - M is Li and/or Na,
  - the weight ratio of $SiO_2:K_2O$ is between about 2.5:1 and about 4.0:1, and
  - the weight ratio of $SiO_2:M_2O$ is between about 2.2:0.1 and about 4.5:0.1;
- about 0.5% w/w-about 5% w/w of a hydroxylated amine compound and/or quaternary ammonium salt;
- about 10% w/w-about 20% w/w of a polyhydric organic compound; and
- about 15% w/w-about 35% w/w water;

in construction.

The use of glazing laminates in construction is known in the art and can be effected by any suitably skilled construction worker.

Constructions

Glazing laminates described in this specification can be used in a wide variety of constructions, for example being fixed in an external or internal door or window frame, being used as the outer wall of a building (such as a house or office block) or in vehicle construction.

A further embodiment is a construction comprising a glazing laminate, where the glazing laminate comprises:
- a first pane and a second pane, which may be the same or different; and
- a fire resistant interlayer between the first pane and the second pane;

And where the fire-resistant interlayer is prepared from an aqueous composition comprising:
- A mixed alkali metal silicate of general formula $SiO_2 \cdot K_2O \cdot M_2O$, where:
  - M is Li and/or Na,
  - the weight ratio of $SiO_2:K_2O$ is between about 2.5:1 and about 4.0:1, and
  - the weight ratio of $SiO_2:M_2O$ is between about 2.2:0.1 and about 4.5:0.1;
- about 0.5% w/w-about 5% w/w of a hydroxylated amine compound and/or quaternary ammonium salt;
- about 10% w/w-about 20% w/w of a polyhydric organic compound; and
- about 15% w/w-about 35% w/w water.

In any embodiment where a construction is mentioned, the construction may be a window, door, partition (internal or external), vehicle or building.

FIGURES

DETAILED DESCRIPTION

Preparation of Aqueous Compositions

Figure 1:
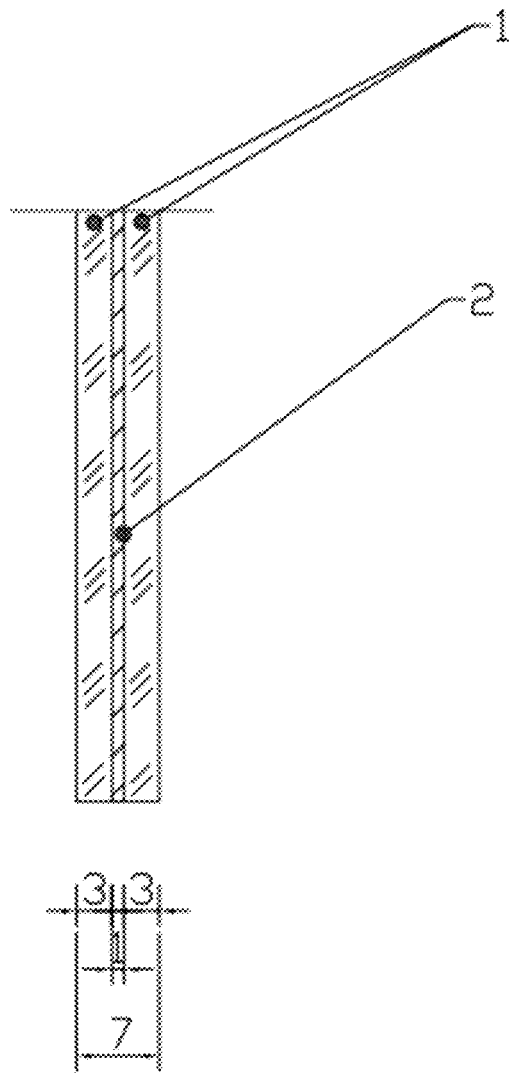
FIG. 1 shows the cross-section of an example glazing laminate in an about 3 mm width/1 mm width/3 mm width pane/interlayer/pane configuration (a "3/1/3 construction type laminate").

An example aqueous composition for preparing a fire-resistant interlayer according to the claims was prepared as a two-component mix. The first component was prepared by mixing a silica sol (Levasil® CS50-34P 50/50 w/w aqueous; 82.3% w/w) with glycerol (99.5% purity, 16.6% w/w) and ethanolamine (99% purity, 1.1% w/w). This mixture was distilled in order to reduce the water content to 11%. The second component was made by mixing potassium hydroxide (50% aqueous solution, 89.1% w/w), sodium hydroxide (50% aqueous solution, 7.8% w/w) and sodium aluminate (40% aqueous solution, 3.1% w/w). The two component solutions were then added together in the proportions 65.66% w/w silica sol mix to 34.34% w/w basic hydroxide mix. The components were vigorously mixed under reduced pressure while controlling the temperature below 60° C. in order to avoid evaporation or a runaway reaction. Finally, the mixture was heated at 50° C. for 30 minutes then rapidly cooled to approximately 25° C., retarding further reaction.

Various aqueous compositions with the desired properties were prepared according to this basic method. They are shown in Table 1. Asterisked Examples are for reference only, and do not form part of the invention.

TABLE 1

Example Aqueous Compositions for Preparing Fire-resistant Interlayers

| Composition | w/w % $H_2O$ | w/w % $SiO_2$ | w/w % $NaAl_2O_3$ | w/w % Ethanolamine | w/w % Xylitol | w/w % Glycerol | w/w % $Na_2O$ | w/w % $K_2O$ | Wt. ratio $SiO_2:K_2O:Na_2O$ |
|---|---|---|---|---|---|---|---|---|---|
| A* | 46.5 | 35.2 | 0 | 0 | 0 | 4.5 | 0 | 12.8 | 2.9:1:0 |
| B* | 47 | 31.0 | 0.19 | 2.0 | 0 | 3.9 | 0 | 12.2 | 2.5:1:0 |
| C | 29.5 | 37.6 | 0 | 1.2 | 5.8 | 10.5 | 0.9 | 13.1 | 2.9:1:0.07 |
| D | 29.5 | 37.5 | 0 | 1.2 | 5.8 | 10.4 | 0.9 | 13.1 | 2.9:1:0.07 |
| E | 32 | 37.1 | 0.14 | 1.1 | 5.7 | 10.3 | 0.9 | 13.0 | 2.9:1:0.07 |
| F | 32 | 35.7 | 0 | 1.1 | 5.5 | 9.9 | 0.9 | 12.5 | 2.9:1:0.07 |
| G | 32 | 35.7 | 0 | 1.1 | 5.5 | 9.9 | 0.9 | 12.5 | 2.9:1:0.07 |
| H | 32 | 37.3 | 0 | 1.0 | 0 | 12.5 | 1.1 | 15.0 | 2.5:1:0.07 |
| I* | 31.5 | 38.0 | 0.07 | 1.0 | 0 | 15.0 | 6.3 | 7.1 | 5.4:1:0.88 |
| J | 32.5 | 36.8 | 0 | 1.0 | 0 | 14.8 | 1.3 | 12.9 | 2.9:1:0.10 |
| K | 32.5 | 31.5 | 0.08 | 1.0 | 0 | 15.0 | 1.4 | 12.8 | 2.5:1:0.11 |
| L | 32.5 | 36.8 | 0.08 | 1.0 | 0 | 14.8 | 1.3 | 12.9 | 2.9:1:0.10 |
| M | 32.5 | 36.8 | 0.08 | 1.0 | 0 | 14.8 | 1.3 | 12.9 | 2.9:1:0.10 |
| N* | 32.5 | 38.0 | 0 | 1.0 | 0 | 15.0 | 6.4 | 7.1 | 5.3:1:0.90 |

TABLE 1-continued

Example Aqueous Compositions for Preparing Fire-resistant Interlayers

| Composition | w/w % $H_2O$ | w/w % $SiO_2$ | w/w % $NaAl_2O_3$ | w/w % Ethanolamine | w/w % Xylitol | w/w % Glycerol | w/w % $Na_2O$ | w/w % $K_2O$ | Wt. ratio $SiO_2:K_2O:Na_2O$ |
|---|---|---|---|---|---|---|---|---|---|
| O | 32.5 | 36.8 | 0.08 | 1.0 | 0 | 14.8 | 1.3 | 12.9 | 2.9:1:0.10 |
| P | 32.5 | 36.8 | 0.08 | 1.0 | 0 | 14.8 | 1.3 | 12.9 | 2.9:1:0.10 |
| Q | 32.5 | 36.5 | 0.15 | 1.0 | 0 | 14.7 | 1.3 | 12.9 | 2.8:1:0.10 |
| R | 32.5 | 37.2 | 0.07 | 1.0 | 0 | 15.0 | 1.3 | 12.3 | 3:1:0.10 |
| S | 32.5 | 36.8 | 0.08 | 1.0 | 0 | 14.8 | 1.3 | 12.9 | 2.9:1:0.10 |
| T | 28.5 | 39.4 | 0.08 | 1.1 | 0 | 15.9 | 1.3 | 13.7 | 2.9:1:0.10 |
| U | 28.5 | 39.4 | 0.08 | 1.1 | 0 | 15.9 | 1.3 | 13.7 | 2.9:1:0.10 |
| V | 28.5 | 39.4 | 0.08 | 1.1 | 0 | 15.9 | 1.3 | 13.7 | 2.9:1:0.10 |
| W | 28.5 | 39.4 | 0.08 | 1.1 | 0 | 15.9 | 1.3 | 13.7 | 2.9:1:0.10 |
| X | 28.3 | 39.4 | 0.08 | 1.1 | 0 | 15.9 | 1.3 | 13.7 | 2.9:1:0.10 |
| Y* | 28.3 | 39.4 | 0.08 | 0 | 0 | 17.0 | 1.3 | 13.7 | 2.9:1:0.10 |
| Z* | 46.5 | 35.2 | 0 | 0 | 0 | 4.5 | 0 | 12.8 | 2.9:1:0 |
| AA | 26.3 | 40.6 | 0.08 | 1.1 | 0.0 | 16.3 | 1.3 | 11.3 | 2.9:1.0:0.1 |
| AB | 21.0 | 45.5 | 0.06 | 1.2 | 0.0 | 18.3 | 1.6 | 12.1 | 3.8:1.0:0.1 |

Preparation of Glazing Laminates

A glazing laminate featuring a fire-resistant interlayer according to the claims was prepared from the above aqueous compositions as follows. The aqueous composition was poured or pumped between two float glass sheets held apart by a spacer or seal, and cured by gentle heating (for example for 24 hrs at 85° C.) to produce the required laminate.

Various configurations of glazing laminate can be constructed according to this basic technique. For example, a "3/1/3 construction type" has two panes (for example of float glass) each of about 3 mm thickness, sandwiching an approximately 1 mm thickness interlayer (see FIG. 1, where dimensions shown under picture are in mm).

Figure 2:
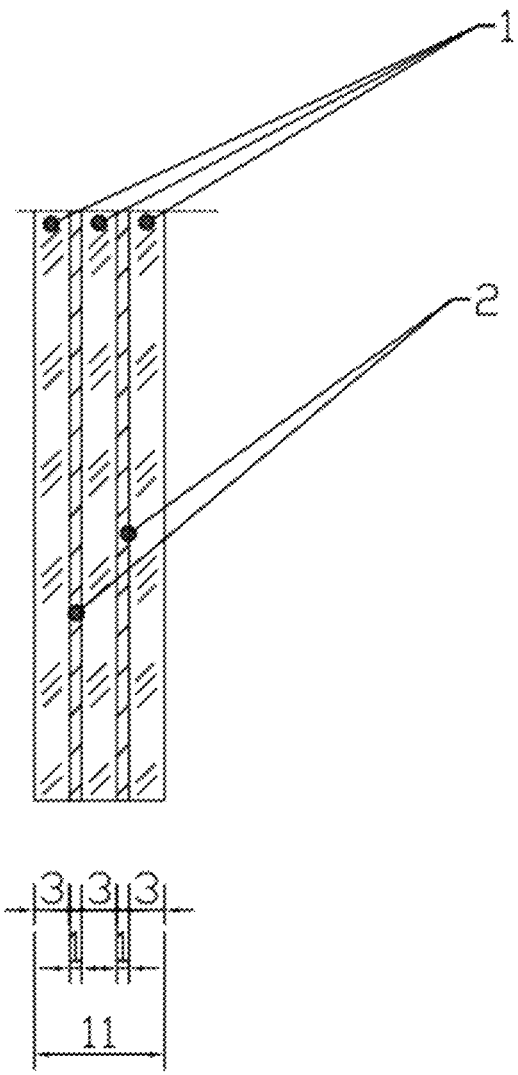
FIG. 2 shows the cross-section of an example glazing laminate in a 3/1/3/1/3 construction type laminate.
Figure 3:
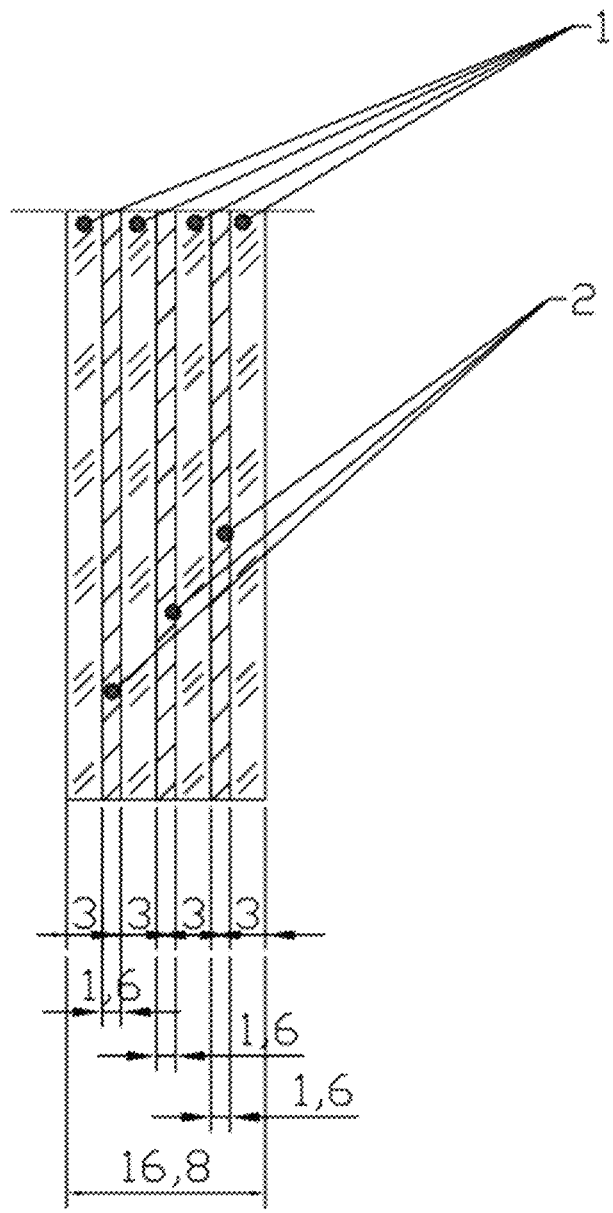
FIG. 3 shows the cross-section of an example glazing laminate in a 3/1/3/1/3/1/3 construction type laminate.
Figure 4:
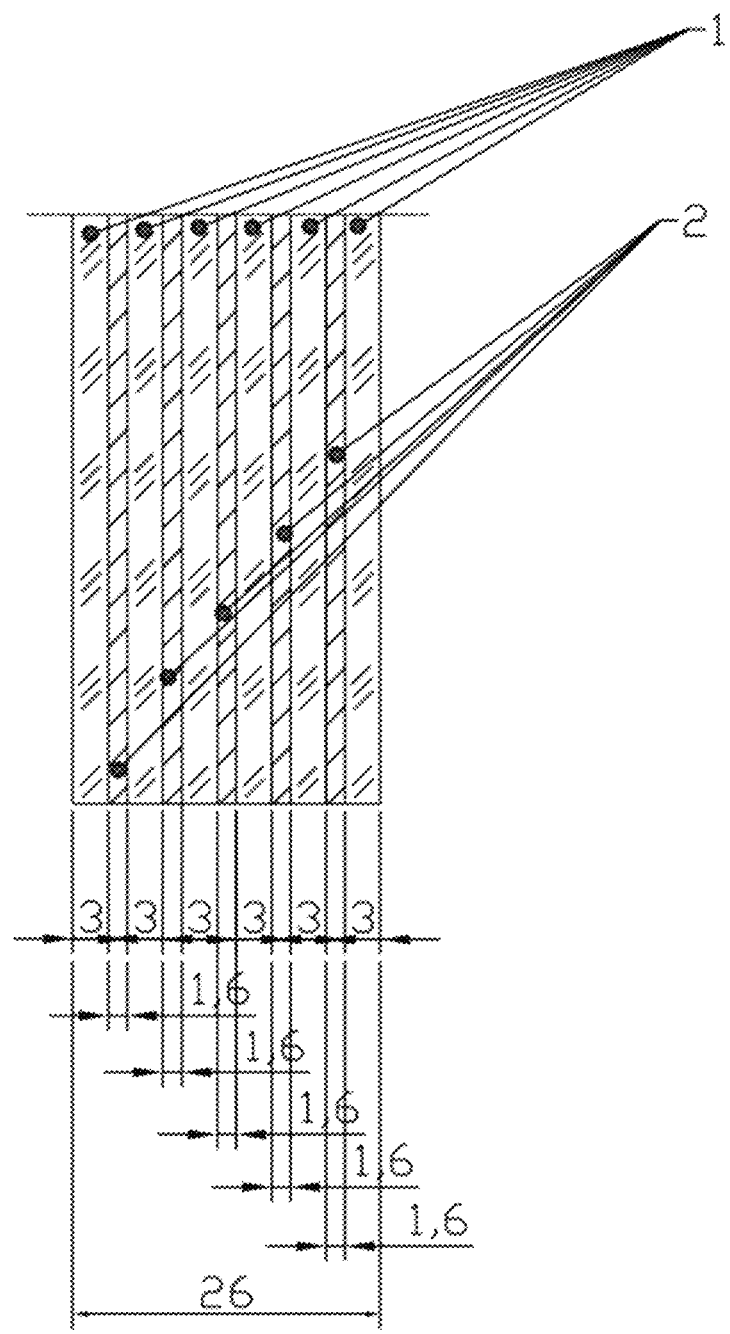
FIG. 4 shows the cross-section of an example glazing laminate in a 3/1/3/1/3/1/3/1/3 construction type laminate.

Similar configurations of alternating about 3 mm thickness pane and about 1 mm thickness interlayer can also be used, forming more complex glazing laminates. For example, a 3/1/3/1/3 construction type has a total of 3 panes of about 3 mm thickness alternating with two interlayers of 1 mm thickness (see FIG. 2). A 3/1/3/1/3/1/3 construction type has a total of 4 panes of about 3 mm thickness alternating with three interlayers, all interlayers being similarly enclosed by glass (FIG. 3). A 3/1/3/1/3/1/3/1/3 construction type uses the same alternating structure (FIG. 4), and so on.

Different thicknesses of glass and interlayer can also be used to prepare suitable glazing laminates, for example in a 3/1.1/3, 3/1.1/3/1.1/3, 3/1.1/4/1.1/3, 3/1.6/3/1.6/3/1.6/3, 3/1.6/3/1.6/3/1.6/3/1.6/3, 4/1/4, 4/2/4, 5/3/5, 2.8/2.8/1.1/2.8, 2.8/1.1/2.8/1.1/2.8, 2.8/1.1/4/1.1/3, 2.8/1.6/2.8/1.6/2.8/1.6/2.8, 2.8/1.6/2.8/1.6/2.8/1.6/2.8/1.6/2.8, 4/1/4, 4/2/4 or 5/3/5 arrangement, although other possible arrangements will be apparent to a person skilled in the art.

The figures show example laminates described in this specification. In the figures, 1 is a sheet or pane of glass (for example float glass) and 2 is fire-resistant interlayer as embodied herein. Numerals at the bottom of the figures are in mm.

Testing Protocols

Viscosity/pourability testing was carried out qualitatively by attempting to pour the aqueous compositions into the internal space of a preconstructed glazing laminate template formed of two panes held together with a spacer or seal. Suitable compositions were seen to flow freely into the internal space of the glazing laminate precursor without the formation of an excess of bubbles, meaning they were amenable to casting. Compositions with a very high viscosity (e.g. Example Y) were not castable.

Figure 5:
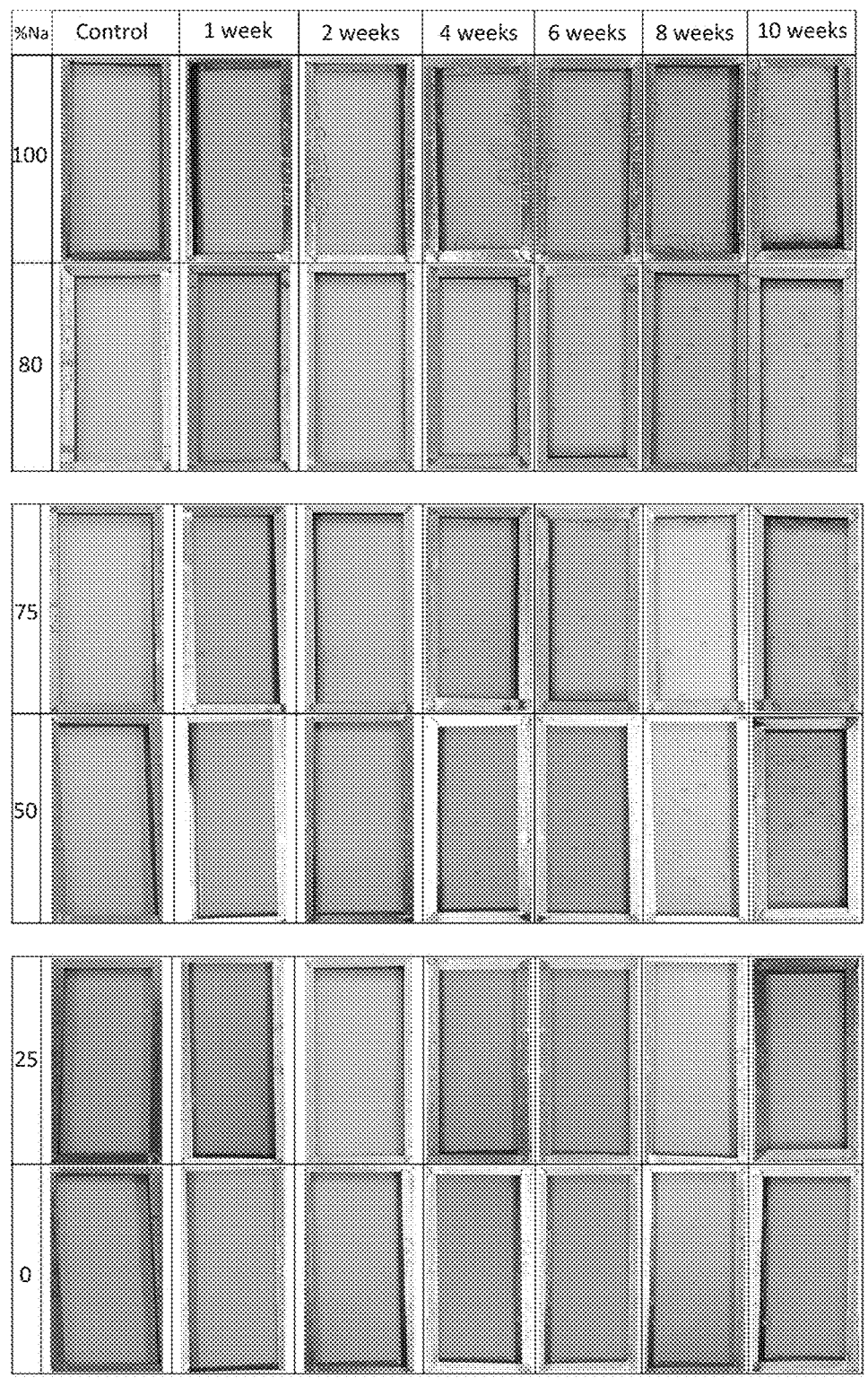
FIG. 5 shows the UV stability testing results for a range of interlayer compositions.

UV Stability testing was carried out according to EN 12543-4-2011 which specifies test methods in respect of resistance to high temperature, humidity and radiation for laminated glass and laminated safety glass for use in building. The UV test performed was of 2000-hour duration. At the end of the test, plates were visually inspected for bubble formation, with few or no bubbles leading to a positive result. FIG. 5 shows the UV stability of a range of interlayers correlated with percentage sodium.

Glazing laminate fire tests were carried out according to publicly available European standards EN1364-1:2015 and EN1363-1:2012.

TABLE 2

Example Glazing Laminates and Test Results

| Composition | Viscosity of Composition on Pouring | Thickness of Glazing Unit (mm) | Construction Type | EN1353 Fire Test result (Integrity E) | EN1353 Fire Test Result (Integrity EI) | UV Stable |
|---|---|---|---|---|---|---|
| A* | low | 9 | 4/1/4 | <15 | NR | Yes |
| B* | low | 7 | 3/1/3 | 16 | NR | Yes |
| C | high | 7 | 3/1/3 | 45 | NR | Yes |
| D | high | 11 | 3/1/3/1/3 | 70 | NR | Yes |
| E | medium | 7 | 3/1/3 | 60 | — | Yes |
| F | medium | 7 | 3/1/3 | 52 | — | Yes |
| G | medium | 11 | 3/1/3/1/3 | 56 | | Yes |
| H | medium | 7 | 3/1/3 | 50 | — | Yes |
| I* | high | 7 | 3/1/3 | 40 | NR | No |
| J | low | 7 | 3/1/3 | 35 | — | Yes |
| K | medium | 7 | 3/1/3 | 40 | — | Yes |

TABLE 2-continued

Example Glazing Laminates and Test Results

| Composition | Viscosity of Composition on Pouring | Thickness of Glazing Unit (mm) | Construction Type | EN1353 Fire Test result (Integrity E) | EN1353 Fire Test Result (Integrity EI) | UV Stable |
|---|---|---|---|---|---|---|
| L | low | 11 | 3/1/3/1/3 | 67+ [1] | — | Yes |
| M | low | 11 | 3/1/3/1/3 | 61+ [1] | — | Yes |
| N* | med | 7 | 3/1/3 | 53 | NR | No |
| O | low | 11 | 3/1/3/1/3 | 50 | — | Yes |
| P | low | 15 | 3/1/3/1/3/1/3 | 52 | 37 | Yes |
| Q | low | 11 | 3/1/3/1/3 | 51 | — | Yes |
| R | low | 11 | 3/1/3/1/3 | 30 | — | Yes |
| S | low | 11 | 3/1/3/1/3 | 39 | — | Yes |
| T | medium | 7 | 3/1/3 | 45 | — | Yes |
| U | medium | 11 | 3/1/3/1/3 | 109 | — | Yes |
| V | medium | 11 | 3/1/3/1/3 | 72+ [1] | — | Yes |
| W | medium | 11 | 3/1/3/1/3 | 67+ [1] | — | Yes |
| X | medium | 25 | 3/1/3/1/3/1/3/1/3 | 71+ [1] | 66 | Yes |
| Y* | very high | 11 | 3/1/3/1/3 | — | — | Yes |
| Z* | low | 10 | 4/2/4 | 2 | NR | Yes |
| AA | medium | 7 | 3/1/3 | — | — | Yes |
| AB | high | 7 | 3/1/3 | — | — | Yes |

[1] Terminated without failure.

High temperature char-flow melt tests were adapted from known glaze melt fluidity tests using readily available materials. A piece of vermiculite board 100 mm×200 mm×25 mm had one short edge chamfered at 450 and a hole (diameter 25 mm, depth 10 mm) drilled in each corner of the opposite end, 10 mm from each edge, so that when the board was stood on the chamfer to form a 45° slope the holes were on the top face. To compare the char-flow two different silicates interlayer materials, a disc of the silicate (diameter 25 mm and thickness 5 mm) was placed into each hole. The vermiculite board was placed flat in a furnace with the holes uppermost and heated in stages to 90° C., 150° C., and 1000° C., leaving it for approximately 15 minutes at each temperature, so that all water is driven off leaving the silicate as a collapsed melt. The test boards were then cooled and inclined to 45° using a support. The furnace was then reheated to 1000° C. and left for several hours for the silicates to melt and flow down the slope. Three hours was generally found to be enough time to differentiate flow rates, though this differed for individual samples. After this time the furnace was turned off, the test board cooled, and the relevant measurements made.

Figure 6:
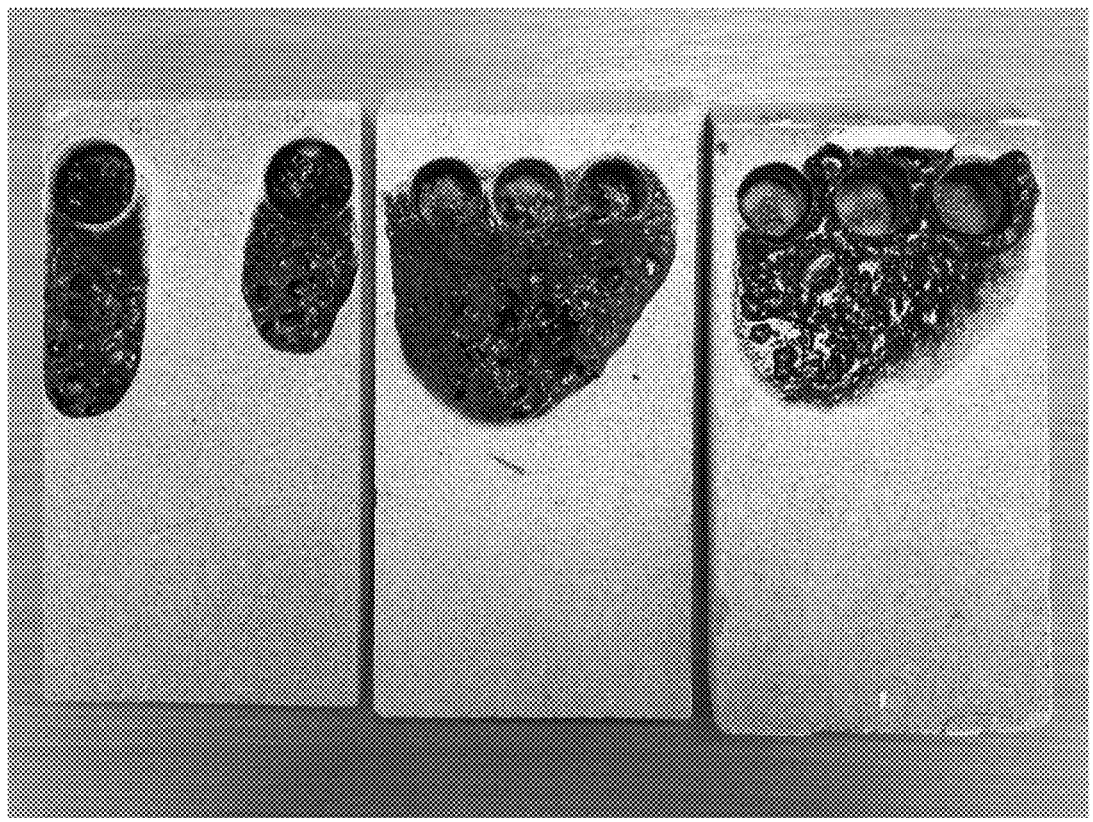
FIG. 6 shows the char-flow melt of interlayers comprising different compositions of alkali metal silicate.

The results of the char-flow experiments are shown in FIG. 6. The three plates in the figure show the char flow of various mixed sodium and potassium silicate-based interlayers when placed in the circular gap and subjected to the fire test. In each plate the amount of sodium relative to potassium increases from left to right across the plate, and the left-most hole represents an interlayer with only potassium silicate present and no sodium silicate. It can be seen that as levels of sodium silicate increase with respect to potassium silicate, the flow of the molten char is reduced. This helps the mixed alkali metal silicates described in this specification maintain the coverage and integrity of the interlayer during a fire, improving the fire-resistant properties of its parent laminate or glazing unit.

What is claimed is:

1. An aqueous composition for preparing a castable UV-stable fire-resistant interlayer, comprising:
   a mixed alkali metal silicate of general formula $SiO_2 \cdot K_2O \cdot M_2O$, where:
     M is Li and/or Na,
     the weight ratio of $SiO_2:K_2O$ is between about 2.5:1 and about 4.0:1, and
     the weight ratio of $SiO_2:M_2O$ is between about 2.2:0.1 and about 4.5:0.1;
   about 0.5% w/w-about 5% w/w of a hydroxylated amine compound;
   about 10% w/w-about 20% w/w of a polyhydric organic compound; and
   about 15% w/w-about 35% w/w water.

2. An aqueous composition as claimed in claim 1 where M is Na.

3. An aqueous composition as claimed in claim 2 where the weight ratio of $SiO_2:K_2O:Na_2O$ is between about 2.5:1:0.1 and about 3:1:0.1.

4. An aqueous composition as claimed in claim 3 where the weight ratio of $SiO_2:K_2O:Na_2O$ is about 3:1:0.1.

5. An aqueous composition as claimed in claim 1 comprising between about 0.01% w/w-about 5% w/w of a water-soluble aluminate.

6. An aqueous composition as claimed in claim 5 where the water-soluble aluminate is sodium aluminate in an amount of about 0.01% w/w-about 0.1%.

7. An aqueous composition as claimed in claim 1 where the hydroxylated amine compound is ethanolamine.

8. An aqueous composition as claimed in claim 1 where the polyhydric organic compound is selected from xylitol and glycerol.

9. An aqueous composition as claimed in claim 8 where the polyhydric organic compound is a mixture of xylitol and glycerol.

10. An aqueous composition as claimed in claim 1 where the amount of water is between about 27% w/w-about 33% w/w.

11. An aqueous composition as claimed in claim 1, comprising:
   a mixed alkali metal silicate of general formula $SiO_2 \cdot K_2O \cdot M_2O$, where M is Na and the weight ratio of $SiO_2:K_2O:Na_2O$ is about 3:1:0.1;
   about 0.01% w/w-about 0.1% w/w sodium aluminate;
   about 0.5% w/w-about 5% w/w ethanolamine;
   0% w/w-about 10% w/w of xylitol;
   about 10% w/w-about 20% w/w of glycerol; and
   about 15% w/w-about 35% w/w water.

12. An aqueous composition as claimed in claim 1, comprising:
a mixed alkali metal silicate of general formula $SiO_2 \cdot K_2O \cdot M_2O$, where M is Na and the silicate comprises:
about 25% w/w-about 45% w/w $SiO_2$,
about 5% w/w-about 20% w/w $K_2O$, and
about 0.5% w/w-about 3% w/w $Na_2O$;
about 0.01% w/w-about 0.1% w/w sodium aluminate;
about 0.5% w/w-about 5% w/w ethanolamine;
0% w/w-about 10% w/w of xylitol;
about 10% w/w-about 20% w/w of glycerol; and
about 15% w/w-about 35% w/w water.

13. An aqueous composition as claimed in claim 1, comprising:
an alkali metal silicate of general formula $SiO_2 \cdot K_2O \cdot M_2O$, where M is Na and the silicate comprises:
about 30% w/w-about 40% w/w $SiO_2$,
about 10% w/w-about 15% w/w $K_2O$, and
about 0.5% w/w-about 1.5% w/w $Na_2O$;
about 0.1% w/w sodium aluminate;
about 1% w/w ethanolamine;
0% w/w-about 6% w/w of xylitol;
about 10% w/w-about 16% w/w of glycerol; and
about 15% w/w-about 35% w/w water.

14. An aqueous composition as claimed in claim 1, comprising:
an alkali metal silicate of general formula $SiO_2 \cdot K_2O \cdot M_2O$, where M is Na and the silicate comprises:
about 40% w/w $SiO_2$,
about 14% w/w $K_2O$, and
about 1.3% w/w $Na_2O$;
about 0.1% w/w sodium aluminate;
about 1% w/w ethanolamine;
about 16% w/w of glycerol; and
about 28% w/w water.

15. A glazing laminate comprising:
a first pane and a second pane; and
a fire resistant interlayer between the first pane and the second pane, wherein the fire-resistant layer is prepared by curing an aqueous composition as claimed in claim 1.

16. A glazing laminate as claimed in claim 15, where the first pane and the second pane consist of float glass.

17. A glazing laminate as claimed in claim 15, where the first pane and the second pane have a thickness between about 1.5 mm and about 5 mm and the fire-resistant interlayer is between about 0.5 mm and about 5 mm in thickness.

* * * * *